(12) United States Patent
Tourapis et al.

(10) Patent No.: US 11,044,478 B2
(45) Date of Patent: Jun. 22, 2021

(54) COMPRESSION WITH MULTI-LEVEL ENCODING

(71) Applicant: Apple Inc., Cupertino, CA (US)

(72) Inventors: Alexandros Tourapis, Los Gatos, CA (US); Jungsun Kim, San Jose, CA (US); Fabrice A. Robinet, Sunnyvale, CA (US); Khaled Mammou, Vancouver (CA); Valery G. Valentin, San Jose, CA (US); Yeping Su, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/459,485

(22) Filed: Jul. 1, 2019

(65) Prior Publication Data
US 2020/0007867 A1   Jan. 2, 2020

Related U.S. Application Data

(60) Provisional application No. 62/693,379, filed on Jul. 2, 2018.

(51) Int. Cl.
*H04N 19/14* (2014.01)
*H04N 19/184* (2014.01)
(Continued)

(52) U.S. Cl.
CPC .......... *H04N 19/14* (2014.11); *H04N 19/117* (2014.11); *H04N 19/124* (2014.11);
(Continued)

(58) Field of Classification Search
CPC .... H04N 19/14; H04N 19/184; H04N 19/117; H04N 19/124; H04N 19/80; H04N 19/172
(Continued)

(56) References Cited

U.S. PATENT DOCUMENTS 6,188,796 B1 *  2/2001  Kadono ............... H04N 19/503
                                                  382/243
8,884,953 B2   11/2014  Chen et al.
(Continued)

FOREIGN PATENT DOCUMENTS

WO   2013022540   2/2013
WO   2019129923   7/2019

OTHER PUBLICATIONS

U.S. Appl. No. 16/132,230, filed Sep. 14, 2018, Khaled Mammou.
(Continued)

*Primary Examiner* — Zaihan Jiang
(74) *Attorney, Agent, or Firm* — Robert C. Kowert; Kowert, Hood, Munyon, Rankin & Goetzel, P.C.

(57) ABSTRACT

A system comprises an encoder configured to compress images, such as image frames comprising attribute information and/or spatial for a point cloud and/or an occupancy map for the point cloud. Also, a system includes a decoder configured to decompress compressed image frames, such as image frames comprising compressed attribute and/or spatial information for the point cloud or an occupancy map for the point cloud. Additionally, the encoder may map N-bit data to M-bit code words, where M is less than N. Alternatively the encoder may map N-bit data to M-bit code words, where M is greater than N. In a similar manner, a decoder may map the M-bit code words back to the N-bit data.

20 Claims, 21 Drawing Sheets

(51) Int. Cl.
*H04N 19/172* (2014.01)
*H04N 19/124* (2014.01)
*H04N 19/80* (2014.01)
*H04N 19/117* (2014.01)

(52) U.S. Cl.
CPC ......... *H04N 19/172* (2014.11); *H04N 19/184* (2014.11); *H04N 19/80* (2014.11)

(58) Field of Classification Search
USPC .................................................. 375/240.03
See application file for complete search history.

(56) References Cited

U.S. PATENT DOCUMENTS

| | | | |
|---|---|---|---|
| 9,171,383 B2 | 10/2015 | Ahn et al. | |
| 10,762,667 B2 | 9/2020 | Mekuria | |
| 2007/0098283 A1* | 5/2007 | Kim | H04N 19/176 382/239 |
| 2009/0087111 A1* | 4/2009 | Noda | H04N 19/176 382/238 |
| 2010/0208807 A1* | 8/2010 | Sikora | H04N 19/85 375/240.12 |
| 2010/0260429 A1* | 10/2010 | Ichinose | H04N 19/134 382/232 |
| 2010/0296579 A1 | 11/2010 | Panchal et al. | |
| 2012/0314026 A1* | 12/2012 | Chen | H04N 19/98 348/43 |
| 2013/0094777 A1* | 4/2013 | Nomura | H04N 19/27 382/233 |
| 2013/0329778 A1* | 12/2013 | Su | H04N 19/132 375/240.01 |
| 2014/0098855 A1* | 4/2014 | Gu | H04N 19/139 375/240.03 |
| 2015/0139560 A1* | 5/2015 | DeWeert | H04N 19/42 382/233 |
| 2017/0337724 A1 | 11/2017 | Gervais et al. | |
| 2017/0347120 A1 | 11/2017 | Chou et al. | |
| 2018/0268570 A1 | 9/2018 | Budagavi et al. | |
| 2019/0197739 A1 | 6/2019 | Sinharoy et al. | |
| 2019/0262726 A1 | 8/2019 | Spencer et al. | |
| 2020/0005518 A1 | 1/2020 | Graziosi | |
| 2020/0153885 A1 | 5/2020 | Lee et al. | |
| 2020/0219285 A1 | 7/2020 | Faramarzi et al. | |
| 2020/0286261 A1 | 9/2020 | Faramarzi et al. | |
| 2020/0302578 A1 | 9/2020 | Graziosi | |

OTHER PUBLICATIONS

Tilo Ochotta et al, "Image-Based Surface Compression", dated Sep. 1, 2008, pp. 1647-1663.
Cohen Robert A et al, "Point Cloud Attribute Compression Using 3-D Intra Prediction and Shape-Adaptive Transforms", dated Mar. 30, 2016, pp. 141-150.
Khaled Mammou et al, "Working Draft of Point Cloud Coding for Category 2 (Draft 1)", dated Apr. 2018, pp. 1-38.
Khaled Mammou et al , "Input Contribution", dated Oct. 8, 2018, pp. 1-42.
Benjamin Bross et al, "High Effeciency Video Coding (HEVC) Text Specification Draft 8", dated Jul. 23, 2012, pp. 1-86.
JunTaek Park et al, "Non-Overlapping Patch Packing in TMC2 with HEVC-SCC", dated Oct. 8, 2018, pp. 1-6.
Sebastian Schwarz, et al., "Emerging MPEG Standards for Point Cloud Compression", IEEE Journal on Emerging and Selected Topics in Circuits and Systems, vol. 9, No. 1, Mar. 2019, pp. 133-148.
Li Li, et al., Efficient Projected Frame Padding for Video-based Point Cloud Compression, IEEE Transactions on Multimedia, doi: 10.100/TMM.2020.3016894, 2020, pp. 1-14.
Lujia Wang, et al., "Point-cloud Compression Using Data Independent Method—A 3D Discrete Cosine Transform Approach", in Proceedings of the 2017 IEEE International Conference on Information and Automation (ICIA), Jul. 2017, pp. 1-6.
Ismael Daribo, et al., "Efficient Rate-Distortion Compression on Dynamic Point Cloud for Grid-Pattern-Based 3D Scanning Systems", 3D Research 3,1, Springer, 2012, pp. 1-9.
Yiting Shao, et al., "Attribute Compression of 3D Point Clouds Using Laplacian Sparsity Optimized Graph Transform", 2017 IEEE Visual Communications and Image Processing (VCIP), IEEE, 2017, p. 1-4.
Siheng Chen, et al., "Fast Resampling of 3D Point Clouds via Graphs", arX1v:1702.06397v1, Feb. 11, 2017, pp. 1-15.
Nahid Sheikhi Pour, "Improvements for Projection-Based Point Cloud Compression", MS Thesis, 2018, pp. 1-75.
Robert Skupin, et al., "Multiview Point Cloud Filtering for Spatiotemporal Consistency", VISAPP 2014—International Conference on Computer Vision Theory and Applications, 2014, pp. 531-538.

* cited by examiner

*Simplified Example of Operations to
Round-Up N-Bit Pixel Values into an M-Bit Representation
in a Way that Preserves the MSB,
Where: N=3, M=2, and O=N-M=1*

Possible Pixel Values in N-bit Representation

```
0 0 0    -502
0 0 1
0 1 0
0 1 1
1 0 0
1 0 1
1 1 0
1 1 1
```
(e.g. X)

*Round up by adding 1 shifted Left to the N-M=O Location*
e.g. X+(1<<O)),
[0 1 0]
⟶

Pixel Values with 1 Added to N-M Location

```
0 1 0    -504
0 1 1
1 0 0
1 0 1
1 1 0
1 1 1
1 0 0 0
1 0 0 1
```

Shift the resultant right by (O+1)=2
e.g. (Resultant from adding 1 to the N-M Location)>>(O+1)

MSB is preserved without overflow error in M-bit representation

```
0 1 0    -506
0 1 1
1 0 0
1 0 1
1 1 0
1 1 1
1 0 0 0
1 0 0 1
```

⟶

```
0 0    -508
0 0
0 1
0 1
0 1
0 1
1 0
1 0
```

*Rounded-Up Possible Pixel Values in M-bit Representation (e.g. y_0)*

FIG. 5A

*Simplified Example of Operations to Determine Error Values for Rounded-Up Pixel Values, Where: N=3, M=2, and O=N-M=1*

Possible Pixel Values in N-bit Representation

| 0 | 0 | 0 |
|---|---|---|
| 0 | 0 | 1 |
| 0 | 1 | 0 |
| 0 | 1 | 1 |
| 1 | 0 | 0 |
| 1 | 0 | 1 |
| 1 | 1 | 0 |
| 1 | 1 | 1 |

502

(e.g. X)

Subtract Rounded-Up Pixel Values Shifted Left by O+1 from Original Pixel Values (X)

e.g. X-(y_0<<(O+1))

Rounded-Up Possible Pixel Values in M-bit Representation Shifted Left (O+1)=2

| 0 | 0 | 0 | 0 |
|---|---|---|---|
| 0 | 0 | 0 | 0 |
| 0 | 1 | 0 | 0 |
| 0 | 1 | 0 | 0 |
| 0 | 1 | 0 | 0 |
| 0 | 1 | 0 | 0 |
| 1 | 0 | 0 | 0 |
| 1 | 0 | 0 | 0 |

510

(e.g. y_0<<(O+1))

Resultant

|   | 0 | 0 |
|---|---|---|
|   | 0 | 1 |
| - | 1 | 0 |
| - | 0 | 1 |
|   | 0 | 0 |
|   | 0 | 1 |
| - | 1 | 0 |
| - | 0 | 1 |

512

Add 1 Shifted Left by O=1 to the Resultant
e.g. (1<<O),[0 1 0]

| 1 | 0 |
|---|---|
| 1 | 1 |
| 0 | 0 |
| 0 | 1 |
| 1 | 0 |
| 1 | 1 |
| 0 | 0 |
| 0 | 1 |

514

Error Values in M-bit Representation (e.g. y_1)

FIG. 5B

COMPRESSION WITH MULTI-LEVEL ENCODING

PRIORITY CLAIM

This application claims benefit of priority to U.S. Provisional Application Ser. No. 62/693,379, entitled "Point Cloud Compression with Multi-Level Encoding", filed Jul. 2, 2018, and which is incorporated herein by reference in its entirety.

BACKGROUND

Technical Field

This disclosure relates generally to compression and decompression of image frames with pixel values that have a bit-depth different from a bit-depth supported by an encoder encoding the image frames. In at least one application, this technique is applied to encoding image frames for compressed point clouds, wherein the point clouds comprise a plurality of points, each having associated spatial information and attribute information.

Description of the Related Art

Various video or image encoding/decoding algorithms allow for data to be converted from high bit-depth images to lower bit-depth images. However, such algorithms reduce the quality of the higher bit-depth images in the conversion process and result in losses (e.g. they provide lossy compression). However, in some applications, such as in point cloud compression, lossy compression of higher-bit depth images using lower bit-depth encoding/decoding algorithms may result in sub-par performance.

SUMMARY OF EMBODIMENTS

In some embodiments, a system includes an encoder configured to encode an image with pixel values comprising N-bit pixel values into one or more image frames with M-bit pixel values. In order to encode the N-bit pixel values into the one or more image frames, the encoder is configured to determine whether a bit-depth of the N-bit pixel values of the pixels of the image being encoded exceeds an image frame bit-depth supported by the encoder.

In response to determining the bit-depth of the N-bit pixel values of the pixels of the image being encoded exceeds the image frame bit-depth supported by the encoder, the encoder is configured to, for each N-bit pixel value of the image being encoded round the N-bit pixel value to a pixel value expressed using an M-bit pixel value supported by the encoder and determine an error value between the N-bit pixel value of the image being encoded and a rounded pixel value expressed using the M-bit pixel value. The encoder is further configured to encode a first image frame for the image being encoded, wherein the rounded pixel values expressed using the M-bit pixel values are encoded for pixels in the first image frame at pixel locations corresponding to the pixels of the image being encoded. Also, the encoder is configured to encode a second image frame for the image being encoded, wherein the determined error values are encoded for pixels in the second image frame at pixel locations corresponding to the pixels of the image being encoded.

Additionally, in response to determining, the bit-depth of the pixel values of the image being encoded are less than the image frame bit-depth supported by the encoder, the encoder is configured to scale the pixel values of the image being encoded such that the pixel values span a range of M-bit pixel values supported by the encoder. In some embodiments, the encoder is also configured to apply a spatial smoothing filter to the up-scaled pixel values, wherein the spatial smoothing filter adjusts the up-scaled pixel values to further improve compression performance or to reduce losses. Additionally, the encoder is configured to encode one or more mapping parameters for use in converting the encoded up-scaled pixel values back into an N-bit pixel values, for example by a decoder.

In some embodiments, a system includes a decoder configured to receive one or more image frames comprising M-bit pixel values encoded from an image with pixel values comprising N-bit pixel values and reconstruct the image comprising N-bit pixel values from the one or more image frames. In order to reconstruct the image comprising the N-bit pixel values from the one or more image frames, the decoder is configured to identify, based on a signaled value, one or more image frames to be used to reconstruct the image comprising N-bit pixel values.

Also, for a given image with N-bit pixel values that is to be reconstructed from two or more image frames comprising M-bit pixel values, the decoder is configured to decode a first image frame comprising rounded N-bit pixel values that have been rounded to be expressed using an M-bit pixel value and decode a second image frame comprising error values for the rounded N-bit pixel values. Additionally, the decoder is configured to modify the decoded rounded N-bit pixel values based on the error values to result in N-bit pixel values such as prior to the rounding.

Also, for a given image with N-bit pixel values that is to be reconstructed from a single image frame comprising M-bit pixel values, the decoder is configured to determine a mapping between the N-bit pixel values and the M-bit pixel values of the single image frame, wherein M is greater than N. The decoder is also configured to adjust the M-bit pixel values back to N-bit pixel values based on the mapping.

In some embodiments, a method includes encoding an image with pixel values comprising N-bit pixel values into one or more image frames with M-bit pixel values. For each N-bit pixel value of the image being encoded, the encoding includes rounding the N-bit pixel value to a pixel value expressed using an M-bit pixel value and determining an error value between the N-bit pixel value of the image being encoded and a rounded pixel value expressed using the M-bit pixel value. The encoding also includes encoding a first image frame for the image being encoded, wherein the rounded pixel values expressed using the M-bit pixel values are encoded for pixels in the first image frame at pixel locations corresponding to pixels of the image being encoded. Additionally, the encoding includes encoding a second image frame for the image being encoded, wherein the determined error values are encoded for pixels in the second image at the pixel locations corresponding to the pixels of the image being encoded.

In some embodiments, a non-transitory computer-readable medium stores program instructions that, when executed by one or more processors, cause the one or more processors to implement an encoder as described herein.

In some embodiments, a non-transitory computer-readable medium stores program instructions that, when executed by one or more processors, cause the one or more processors to implement a decoder as described herein.

BRIEF DESCRIPTION OF THE DRAWINGS

FIG. 1 also illustrates a decoder decoding the multiple sub-mage frames with M-bit pixel values to reconstruct the image with N-bit pixel values, according to some embodiments.

FIG. 2 also illustrates a decoder decoding the scaled-up image and applying or more mapping ranges to reconstruct the image with N-bit pixel values, according to some embodiments.

FIG. 5A illustrates example bit operations for rounding up an N-bit pixel value in a way that preserves the most significant bit (MSB), according to some embodiments.

FIG. 5B illustrates example bit operations for determining an error value between an original N-bit pixel value and a rounded-up pixel value, according to some embodiments.

Figure 1:
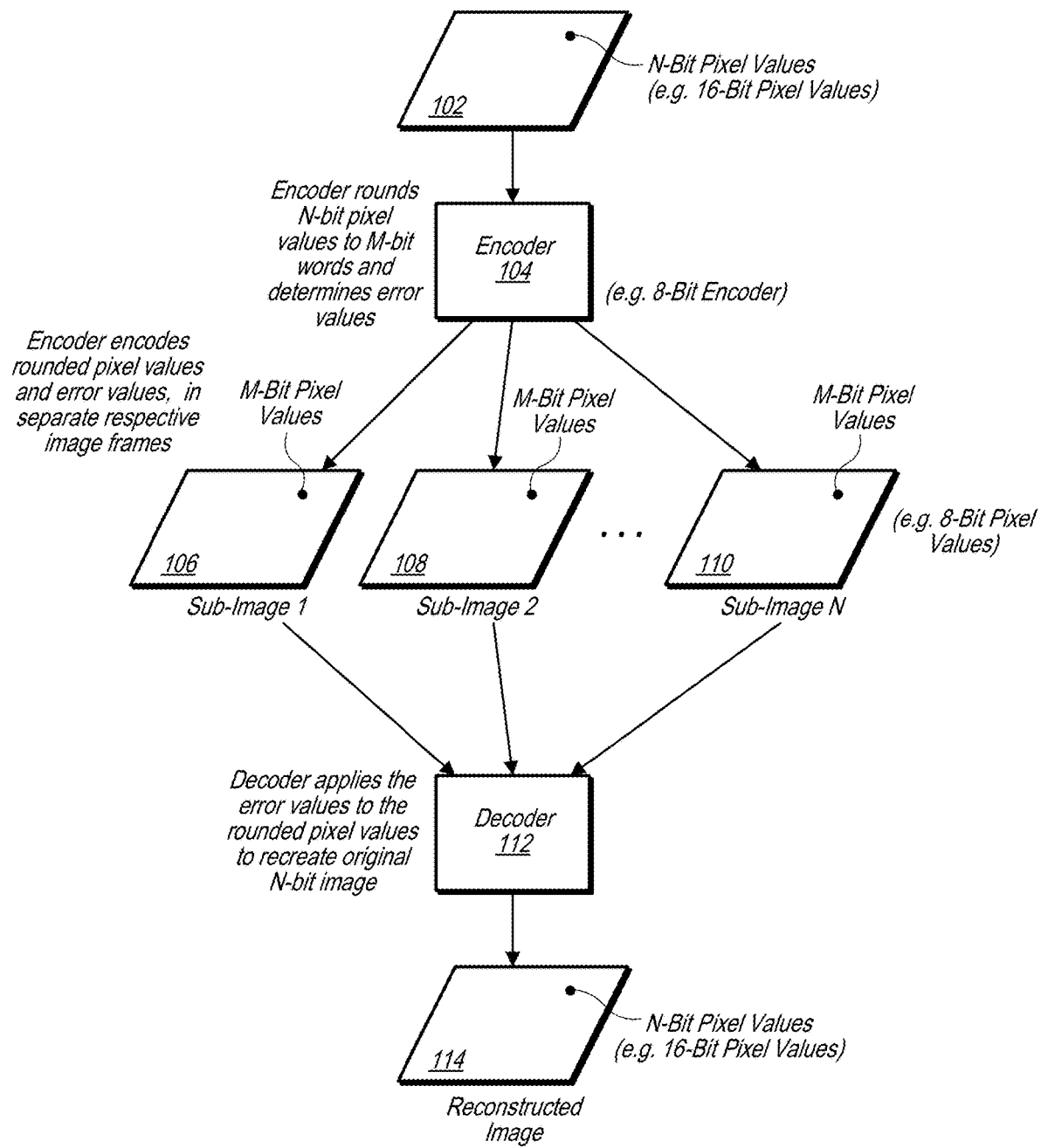
FIG. 1 illustrates an encoder encoding an image with N-bit pixel values via multiple sub-image frames with bit-depth M, wherein N is greater than M, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Some encoders may encode images having pixel values with bit-depths that are less than a particular bit-depth supported by the encoder. For example, in the case of encoders that support greater bit-depths than a bit-depth of an image being encoded, the encoder may add zeros to increase a number of bits in the pixel values without changing the pixel values or may otherwise encode images using lower bit-depth values than a bit-depth supported by the encoder. Also, in the case of encoders that support smaller bit-depths than a bit-depth of an image being encoded, the encoders may truncate least significant bits of pixel values being encoded. Also, other encoders may partition a pixel value, such that for example in a sixteen bit value, the eight most significant bits are encoded as one eight-bit word and the other least significant bits are encoded as another eight-bit word. However, in such an approach distortion introduced during the encoding process may have an equal probability of affecting the most significant bits (e.g. the eight MSB bits that were encoded as the first eight-bit word) or the least significant bits (e.g. the eight LSB bits that were encoded as another eight-bit word). However, for some applications, errors in the MSBs may not be acceptable or may lead to sub-par performance. Also, in the case of an encoder that supports a greater bit-depth than a bit-depth of an image being encoded, simply adding additional zeros to the pixel values or encoding the pixel values as lower bit-depth values may not take full advantage of the capabilities of the encoder.

In some embodiments, in order to provide lossless or near-lossless encoding of images with N-bit pixel values using an M-bit encoder, an encoder may round respective N-bit pixel values for each pixel location of the N-bit image to M-bit values that are supported by the encoder. Additionally, the encoder may determine error values between the original N-bit pixel values and the rounded values expressed as M-bit values. Because the error (e.g. difference between the two values) may be smaller than the overall N-bit pixel value, the error may be expressed as an M-bit value. In some embodiments, wherein the difference between N and M is greater than M, the error value may be rounded up to be expressed as an M-bit value and a second error value may be determined for each pixel value, wherein the second error value represents a difference between a first error value that has been rounded up and the first error value prior to the first error value being rounded up. In some embodiments, if needed, additional third, fourth, etc. error values may be determined in a similar manner.

Additionally, a left shift operation may be applied subsequent to rounding up an N-bit pixel value to ensure that the most significant bit does not overflow the most significant bit (MSB) slot in the M-bit representation. In this way, the MSB is much less likely to be distorted or miss-encoded as compared to a partition method as discussed above. Also, because additional error values are determined such that the error values are fully expressed in the M-bit values, lossless or near lossless performance can be realized by a decoder correcting the rounded pixel values using the error values to result in the original N-bit pixel value. In some embodiments, such an approach may enable lossless or near-lossless encoding of N-bit images using an encoder that supports encoding M-bit images, where M is less than N.

In order to encode the rounded-up pixel values and error values, multiple sub-images may be generated, wherein each sub-image is encoded by a standard video codec in a separate image frame. For example, a first sub-image may include rounded-up pixel values encoded for each pixel location in a first image frame. A second sub-image may include first error values encoded for each pixel location in a second image frame, wherein the error values are encoded at pixel locations that correspond to pixel locations for which the error values were determined. A third or other additional sub-images may be generated and may include second or additional error values encoded in third or additional image frames at pixel locations corresponding to pixel locations for which the second or additional error values were determined. Thus, even if the standard encoder used to encode the N-bit pixel values via multiple sub-images encoded in multiple image frames is a lossy encoder, near lossless performance may be realized after applying the error values to the rounded pixel values at a decoder.

For example, the encoder may encode the M-bit sub-images in accordance with the High Efficiency Video Coding (HEVC/H.265) standard or other suitable standards such as, the Advanced Video Coding (AVC/H.264) standard, the AOMedia Video 1 (AV1) video coding format produced by the Alliance for Open Media (AOM), etc. In some embodiments, the encoder may utilize an image encoder in accordance with a Motion Picture Experts Group (MPEG), a Joint Photography Experts Group (JPEG) standard, an International Telecommunication Union-Telecommunication standard (e.g. ITU-T standard), etc.

Note that for simplicity of explanation, M-bit values have been used for the sub-image with rounded-up pixel values, the sub-image with the first error values, and the sub-image with the second error values. However, in some embodiments, an encoder may encode different bit-depth image frames for respective ones of the sub-images. For example, in some embodiments, an image to be encoded may be a 16-bit image and rounded-up pixel values may be encoded in a 10 bit sub-image while error values are encoded in an 8 bit sub-image Conversely, in some embodiments, an encoder may support a greater bit-depth than an image being encoded. For example, in some embodiments, a bit-depth N of an image being encoded may be less than a bit-depth M supported by an encoder encoding the N-bit image. In such situations, improved performance, such as lossless or near lossless performance, may be realized by taking full advantage of the range of pixel value levels supported by the M-bit depth encoder. For example a scaling factor or transfer function may be applied to the N-bit pixel values to scale the N-bit pixel values to encompass the M-bit pixel value level range of the encoder. In some embodiments, a linear scaling factor may be applied. However, in some embodiments other scaling factors or transfer functions may be applied, wherein the other scaling factors or other transfer functions spread out pixel values that are more commonly used with farther gaps between the pixel values than is done for pixel values that are less frequently used. For example, an eight-bit image may include pixel values that span value levels from 0 to 255 (e.g. $2^8$). Continuing the example, a 16-bit encoder may support encoding pixel values that span value levels from 0 to 65,535 (e.g. $2^{16}$). However, as an example the most common pixel values in the eight-bit image may fall within a range of 0-64. Thus, a scaling operation or transfer function may map larger ranges in the expanded 16-bit value space to N-bit pixel values between 0-64 and may map shorter ranges in the expanded 16-bit value space to N-bit pixel values from 64-255.

For example, an N-bit pixel value of 1 may be mapped to an M-bit value of 150 and a mapping range of 100-200 in M-bit value space may be assigned, wherein any value in M-bit value space between 100 and 200 is mapped to the N-bit pixel value of 1. In contrast, a value of 254 in N-bit pixel space may be mapped to an M-bit value of 65,533 with a mapping range of 65, 530 to 65,535 in M-bit value space. Thus, an error in encoding and decoding a "1" in N-bit value space would have to cause a deviation greater than "50" in M-bit value space for the "1" to be misinterpreted at a decoder as another value. Whereas, a smaller amount of error in encoding and decoding may cause the "254" value in N-bit value space to be misinterpreted at the decoder. However, this trade-off is beneficial because it reduces probabilities of misrepresenting more commonly encoded pixel values at the expense of increasing the probability of misrepresenting infrequently encoded pixel values. Also, it reduces probabilities of a misrepresented pixel value in a reconstructed image reconstructed at a decoder as compared to an even distribution of M-bit value space ranges to N-bit pixel values that are being scaled into M-bit value space.

FIG. 1 illustrates an encoder encoding an image with N-bit pixel values via multiple sub-image frames with bit-depth M, wherein N is greater than M, according to some embodiments. FIG. 1 also illustrates a decoder decoding the multiple sub-mage frames with M-bit pixel values to reconstruct the image with N-bit pixel values, according to some embodiments.

In some embodiments, an encoder such as encoder 104, receives an N-bit image, such as image 102, wherein the N-bit image comprises pixel values with greater bit-depths than a bit-depth at which encoder 104 encodes images. In such instances, an encoder, such as encoder 104, may determine rounded pixel values for the pixels of image 102, for example as described in FIGS. 4, and 5A. Additionally, the encoder determines error values for the rounded pixel values as compared to the original N-bit pixel values in image 102. For example, as described in FIGS. 4 and 5B.

The encoder also encodes a first image frame comprising a sub-image of image 102, such as sub-image 1 in image frame 106, wherein sub-image 1 comprises rounded M-bit pixel values for each pixel at pixel locations that correspond to the original pixels of image 102. In addition, the encoder encodes a second image frame comprising a second sub-image of image 102, such as sub-image 2 in image frame 108, wherein sub-image 2 comprises error values indicating a difference between the original N-bit pixel values of image 102 and the rounded pixel values, such as in sub-image 1. The error values are encoded at pixel locations that correspond to the original pixels of image 102, where an error value for a given N-bit pixel at a given pixel location in image 102 is encoded in sub-image 2 as a pixel value at the same given pixel location for the pixel for which the error value was determined.

In some embodiments, if a difference between the bit-depth of the image being encoded, such as image 102, and a bit-depth at which an encoder encodes image frames is greater than the bit-depth at which the encoder encodes image frames (e.g. if N−M>M), then the encoder may round the determined error values such that they are expressed at a bit-depth in which the encoder encodes image frames. Also, the encoder may determine second (or additional) error values between the rounded error values and the error values prior to being rounded. In such situations, the encoder may encode the second error values (or additional error values N) in sub-image(s) N encoded in other image frames 110.

In some embodiments, a decoder, such as decoder 112, may receive image frames 106, 108, and 110 and may reconstruct a representation 114 of image 102. For example, the decoder may adjust the rounded pixel values expressed as M-bit values in image frame 106 based on the error values encoded in image frame 108. In some embodiments, in which second or additional error values are encoded, the decoder may use a lowest level error value to adjust a higher level rounded error value, and then may use the adjusted higher level error value to adjust another even higher level rounded error value or to correct a rounded pixel value, such as in image frame 106, that comprises sub-image 1 comprising rounded pixel values of image 102.

In some embodiments, an encoder, such as encoder 104 may also receive an N-bit image where N is less than a bit-depth M at which the encoder encodes image frames.

Figure 2:
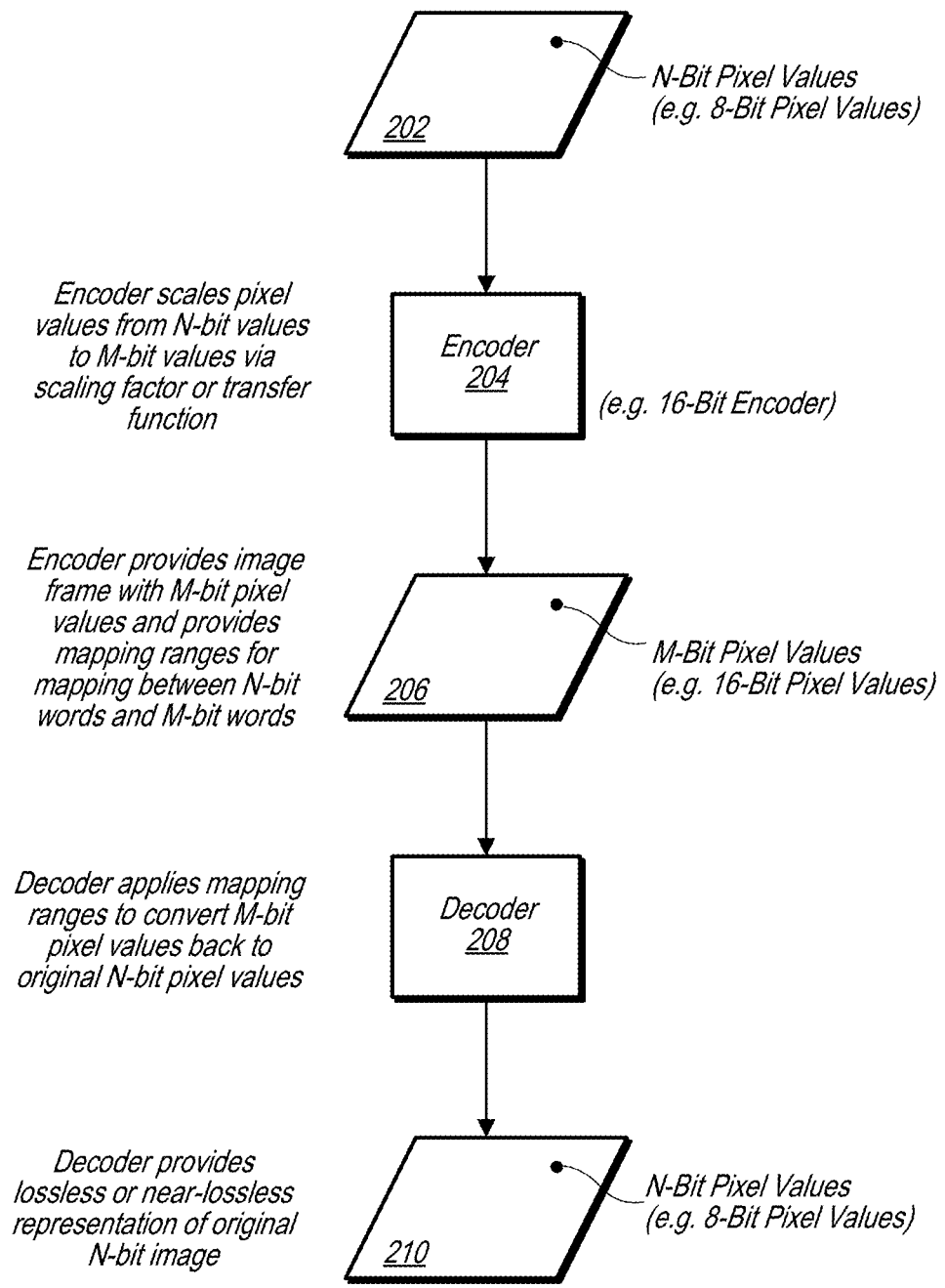
FIG. 2 illustrates an encoder encoding an image with N-bit pixel values via a scaled-up image with bit-depth M, wherein N is less than M, according to some embodiments.

FIG. 2 illustrates an encoder encoding an image with N-bit pixel values via a scaled-up image with bit-depth M, wherein N is less than M, according to some embodiments. FIG. 2 also illustrates a decoder decoding the scaled-up image and applying or more mapping ranges to reconstruct the image with N-bit pixel values, according to some embodiments.

In some embodiments, encoder 204 and decoder 208 as shown in FIG. 2 may be a same or similar encoder or decoder as encoder 104 and decoder 112 shown in FIG. 1.

In some embodiments, an encoder, such as encoder 204, may receive an image, such as image 202, that comprises pixel values with bit-depths that are less than a bit-depth at which the encoder encodes image frames. In some embodiments, an encoder, such as encoder 204, may apply a scaling factor or transfer function to the pixel values of image 202 to scale or transform the pixel values such that the pixel values utilize a greater portion of the pixel value levels supported by the encoder, such as encoder 204. For example, an eight-bit pixel value may have pixel value levels from 0 to 255, whereas a sixteen-bit pixel value may have pixel values levels from 0 to 65,535. Additionally, an encoder, such as encoder 204, may apply or determine one or more mappings (for example via the scaling factor or the transfer function) to map N-bit pixel values to M-bit code words, wherein M is greater than N.

In some embodiments, an encoder, such as encoder 204, may apply a transfer function that maps more commonly encoded N-bit pixel values to M-bit code words that are more spread out than M-bit code words to which loss commonly encoded N-bit pixel values are mapped. In some embodiments, scaling or transforming N-bit pixel values into M-bit code words to take advantage of the bit-depth of an encoder, such as encoder 204, may provide improved loss performance as compared to encoding the pixel values using N-bit pixel values, where N<M. For example, bit distortion may be less likely to alter a value in a reconstructed image converted back to an N-bit pixel representation when the N-bit pixel values are scaled up to M-bit code words and then mapped, at a decoder, back to N-bit pixel values. For example, if a given N-bit pixel value is assigned an M-bit code word and is further mapped to any M-bit value on either side of the M-bit code word, such as an N-bit value of 100 being mapped to an M-bit code word of 400 with a range of +/−50, any M-bit value between 350 and 400 will be interpreted by a decoder as representing N-bit value 100. Thus, distortion introduced in the encoding and decoding process would have to alter the M-bit value of the encoded M-bit word by more than 50 to change the ultimate result when the M-bit word is mapped back to an N-bit value to generate a reconstructed representation of an N-bit image.

Additionally, in some embodiments, a decoder, such as decoder 208, may perform one or more pre-processing processes on an image, such as an M-bit image 206. In some embodiments, a decoder such as decoder 112 may perform similar pre-processing processes on image frames 106, 108, and 110.

In some embodiments, a spatial smoothing filter may be applied to image 206 prior to decoding image 206. The spatial smoothing filter may smooth out high frequencies resulting from the scaling factor or transform function applied at encoder 204. Additionally or alternatively, a spatial smoothing filter may have been applied at encoder 204 before transmitting M-bit image 206 to decoder 208.

Figure 7:
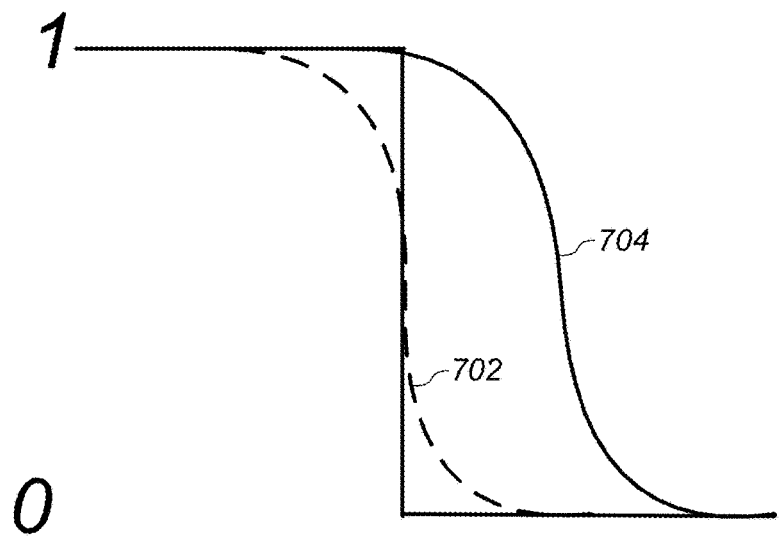
FIG. 7 illustrates an example of two curves, one of which results from applying a smoothing filter, according to some embodiments.

In some embodiments, a spatial smoothing filter may be designed to take into account unequal error costs. For example, an error in miss-encoding or miss-decoding a bit in an M-bit word may cause greater error if the bit is miss-encoded/decoded as a zero when it is really a 1, or vice versa. For example, if greater error results from miss-encoding/decoding a 1 as a zero than miss-encoding/decoding a zero as a 1, a spatial filter can be used to bias ambiguous bits towards a value of 1. For example, FIG. 7 shows the results of a spatial filter being applied to a signal that moves signal 702 toward 704, such that the transition between 1 and zero is less steep. In some embodiments, a bilinear or cubic filter may be used. In some embodiments, a cosine filter, Gaussian filter, a Lanczos filter, etc. may be used.

In some embodiments, quantization parameters (Qps) may be signaled to a decoder, such as decoder 208 or decoder 112. In some embodiments, a decoder such as decoder 208 or 212, or an encoder, such as encoder 104 or 202, may employ any of the pre-processing processes, post-processing processes, color considerations, codec considerations, or lossless considerations as discussed in more detail below.

Figure 3:
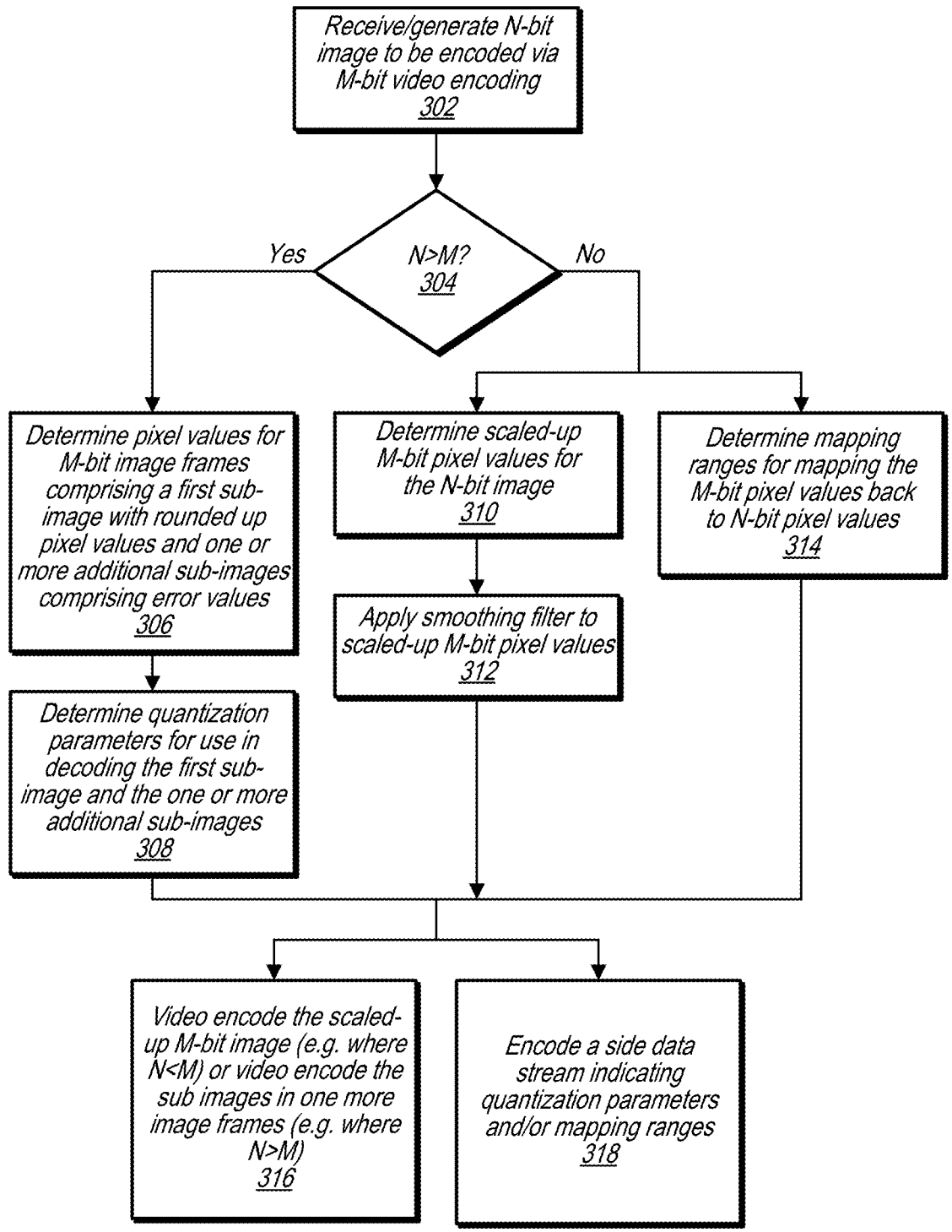
FIG. 3 illustrates a process of encoding an image with N-bit pixel values using one or more M-bit image or sub-image frames, according to some embodiments.

FIG. 3 illustrates a process of encoding an image with N-bit pixel values using one or more M-bit image or sub-image frames, according to some embodiments.

At 302, an encoder receives or generates an N-bit image to be encoded via an M-bit video encoding. For example, the encoder may be an encoder that performs point cloud compression as discussed in more detail in FIGS. 8-15. In such embodiments, the image being encoded may have been generated by the encoder that is performing point cloud compression and the encoder may utilize a video-encoding component that encodes image frames with M bit-depths.

At 304, the encoder may determine whether a bit-depth (N) of the image being encoded is greater than or less than the bit-depth M at which the video encoder/video-encoding component encodes image frames. If N is greater than M, meaning that the image being encoded has a greater bit-depth than a bit-depth at which the encoder encodes image frames, at 306 the encoder determines pixel values for M-bit image frames, wherein the pixel values are rounded-up N-bit pixel values from the N-bit image received or generated at 302.

Also, at 306, the encoder determines error values for the pixel values of the M-bit image frame as compared to the original N-bit pixel values of the image received or generated at 302. Additionally, the encoder encodes a first sub-image in a first M-bit image frame for the rounded values and encodes one or more additional sub-images in one or more additional image frames for determined error values.

Figure 4:
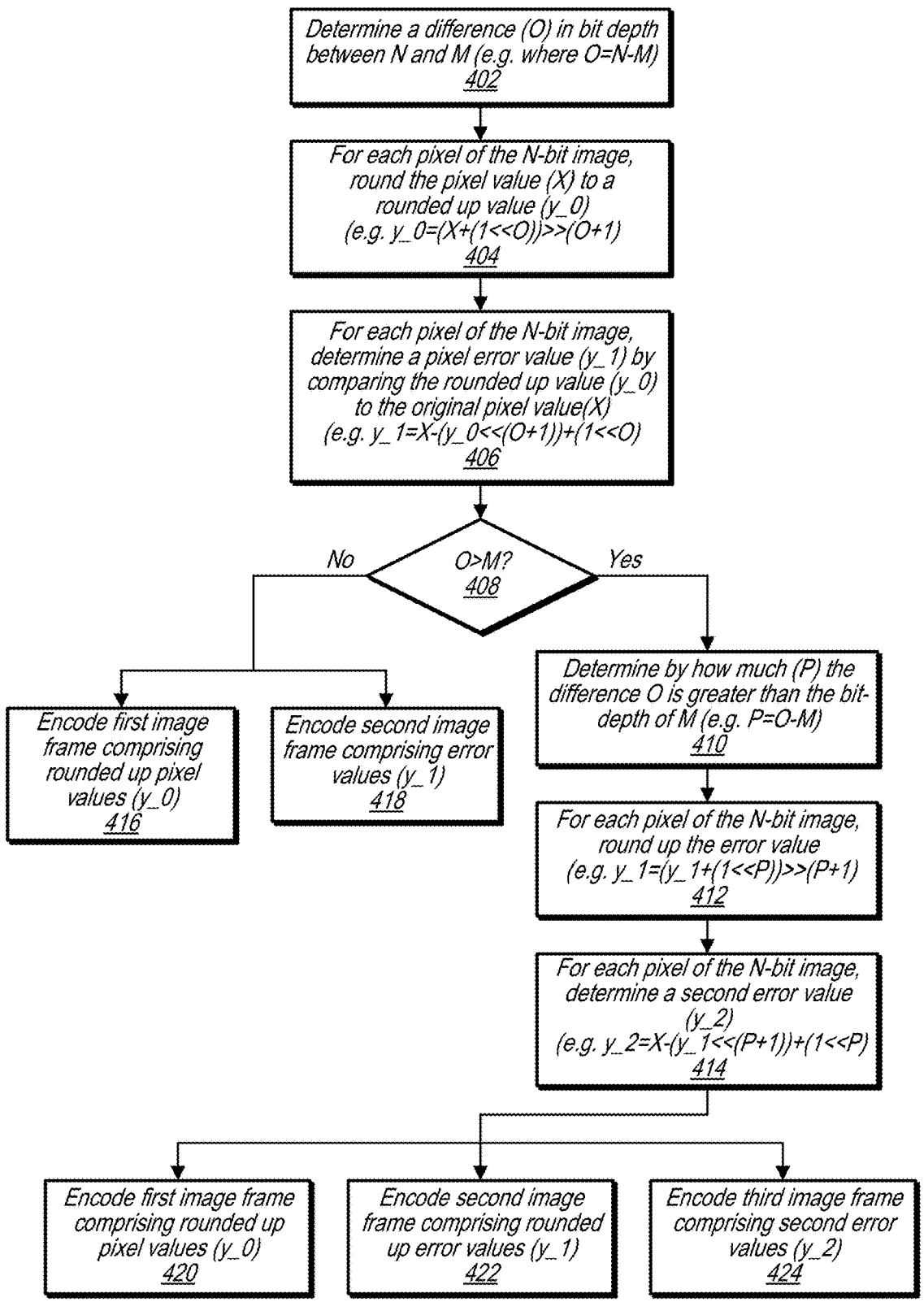
FIG. 4 illustrates aspects of a process of encoding an image with N-bit pixel values using multiple M-bit sub-image frames, where N is greater than M, according to some embodiments.

In some embodiments, an encoder may follow a process as described in FIGS. 4 and 5A-B to encode the sub-image frames at 306.

At 308, the encoder determines quantization parameters for use in decoding the first sub-image and the one or more additional sub-images.

Additionally, at 310, if N is less than M, the encoder determines scaled-up or transformed pixel values for the N-bit image using M-bit code words that utilize the range of pixel value levels available in the M-bit image frames encoded by the encoder.

At 312, the encoder may apply a smoothing filter to the scaled-up M-bit pixel values, as described herein.

At 314, the encoder determines mapping values and/or mapping ranges to map the M-bit code words to N-bit pixel values.

At 316, the encoder video encodes the M-bit image frame with scaled-up or transformed pixel values, in the case of N being less than M. Also, at 316, in the case of N being greater than M, the encoder video encodes the sub-images determined at 306 in separate respective M-bit image frames. In some embodiments, an encoder may encode error values using lesser bit-depth image frames than are used to encode the rounded pixel values.

At 318, the encoder optionally encodes a side data stream indicating quantization parameters and/or mapping ranges.

FIG. 4 illustrates aspects of a process of encoding an image with N-bit pixel values using multiple M-bit sub-image frames, where N is greater than M, according to some embodiments.

At 402, an encoder determines a difference (O) between a bit-depth N of an image to be encoded and a bit-depth M at which the encoder encodes image frames. For example, O=N-M.

At 404, for each pixel of the N-bit image, the encoder rounds up the pixel value (X) to a rounded up value (y_0). For example, FIG. 5A shows a simplified example for determining y_0 for an N-bit pixel value X.

At 406, for each pixel of the N-bit image, the encoder determines an error value (y_1) between the original pixel values (e.g. X) and the rounded-up pixel value (e.g. y_0). For example, FIG. 5B shows a simplified example for determining y_1.

At 408, the encoder determines whether the difference between the bit depth of the image being encoded (N) and the bit-depth of images encoded by the encoder (M), (e.g. O=N-M), is greater than the bit-depth of images encoded by the encoder. Said another way, the encoder determines if O is greater than M.

If so, at 410, the encoder determines by how much O is greater than M, this value is referred to in FIG. 4 as P, where P=O-M.

At 412, the encoder determines a rounded up error value for the error values determined at 406. For example, the rounded up error value, e.g. rounded y_1, may be expressed as $y\_1=(y\_1+(1<<P))>>(P+1)$.

At 414, the encoder determines a second error value (y_2) representing an error between y_1 and y_1 rounded. For example, $y\_2=X-(y\_1<<(P+1))+(1<<P)$.

If O was determined to not be greater than M at 408, then at 416, the encoder encodes a first sub-image comprising rounded up pixel values y_0 determined at 404 in a first M-bit image frame. Also, at 418, the encoder encodes a second sub-image comprising error values y_1 determined at 406 in a second M-bit image frame.

If O was determined to be greater than M at 408, at 420, the encoder encodes a first sub-image comprising rounded up pixel values y_0 determined at 404 in a first M-bit image frame. Also, at 422, the encoder encodes a second sub-image comprising error values y_1 determined at 412 in a second M-bit image frame. Additionally, at 424 the encoder encodes a third sub-image comprising second error values determined at 414 in a third M-bit image frame. Additionally, if P>M, a similar process may be repeated for an additional level of error values based on a value Q, where Q=P−M.

FIG. 5A illustrates example bit operations for rounding up an N-bit pixel value in a way that preserves the most significant bit (MSB), according to some embodiments.

For ease of illustration, FIG. 5A illustrates a simplified example where N=3 and M=2. However, in some embodiments, N and M may be larger values. For example, an image to be encoded may have a 16-bit bit-depth (N) and an encoder may encode M-bit image frames where M is 8, 10, or another value.

Element 502 illustrates all possible pixel value levels for a three bit image (e.g. N=3). Element 508 illustrates rounded-up versions of the possible pixel value levels encoded using M-bit depth values. Additionally, resultants 504 and 506 show intermediate values illustrating operations performed on the possible pixel values of element 502 to round them up to rounded up possible pixel values as shown in element 508. Note that FIG. 5A illustrates all possible pixel values for a three-bit pixel value image. However, in practice, each pixel value of an image being encoded would contain any one of the possible pixel values supported by the bit-depth of the image being encoded as a single value X, not a table as shown in FIGS. 5A and 5B, for example.

FIG. 5A shows values X in element 502 being rounded up by adding a value of 1 shifted left by N−M=O. For example, in the case of N=3, M=2, and O=N−M=1, the value of 1 is added to the bit location 1 over from the left. The underlined values in element 504 show changed bit values that changed as a result of adding the 1 to the N−M location.

Resultant 506 illustrates shifting the resultant 504 of adding 1 to the N−M location to the right by O+1. Note that adding 1 causes the lower two values to over flow into a fourth bit. However, shifting right by O+1 (e.g. 2) ensures that the MSB doesn't overflow the bit register as shown by resultant 506. Thus, element 508, the rounded-up pixel values (e.g. y_0), shows the resultant of shifting right by O+1=2. This method ensures that the most significant bit is preserved. Also any bit errors would have to be large to cause the MSB to be miss-represented when decoded.

FIG. 5B illustrates example bit operations for determining an error value between an original N-bit pixel value and a rounded-up pixel value, according to some embodiments.

In FIG. 5B, element 502 is the same starting N-bit value (X) as in FIG. 5A. From it, the rounded up pixel values, such as in element 508, are shifted left by O+1 (e.g. 2) as shown in resultant 510. They are then subtracted from the values X as included in element 502. This produces the resultants as shown in resultant 512. The resultant 512 is then added to a value of 1 shifted left by O (e.g. 1). This produces the error values expressed in M-bits (e.g. y_1) as shown in element 514.

Similar operations may be performed according to the formulas included herein to determine a rounded y_1 and a y_2. Or, to determine additional error values for additional levels as necessary.

Figure 6:
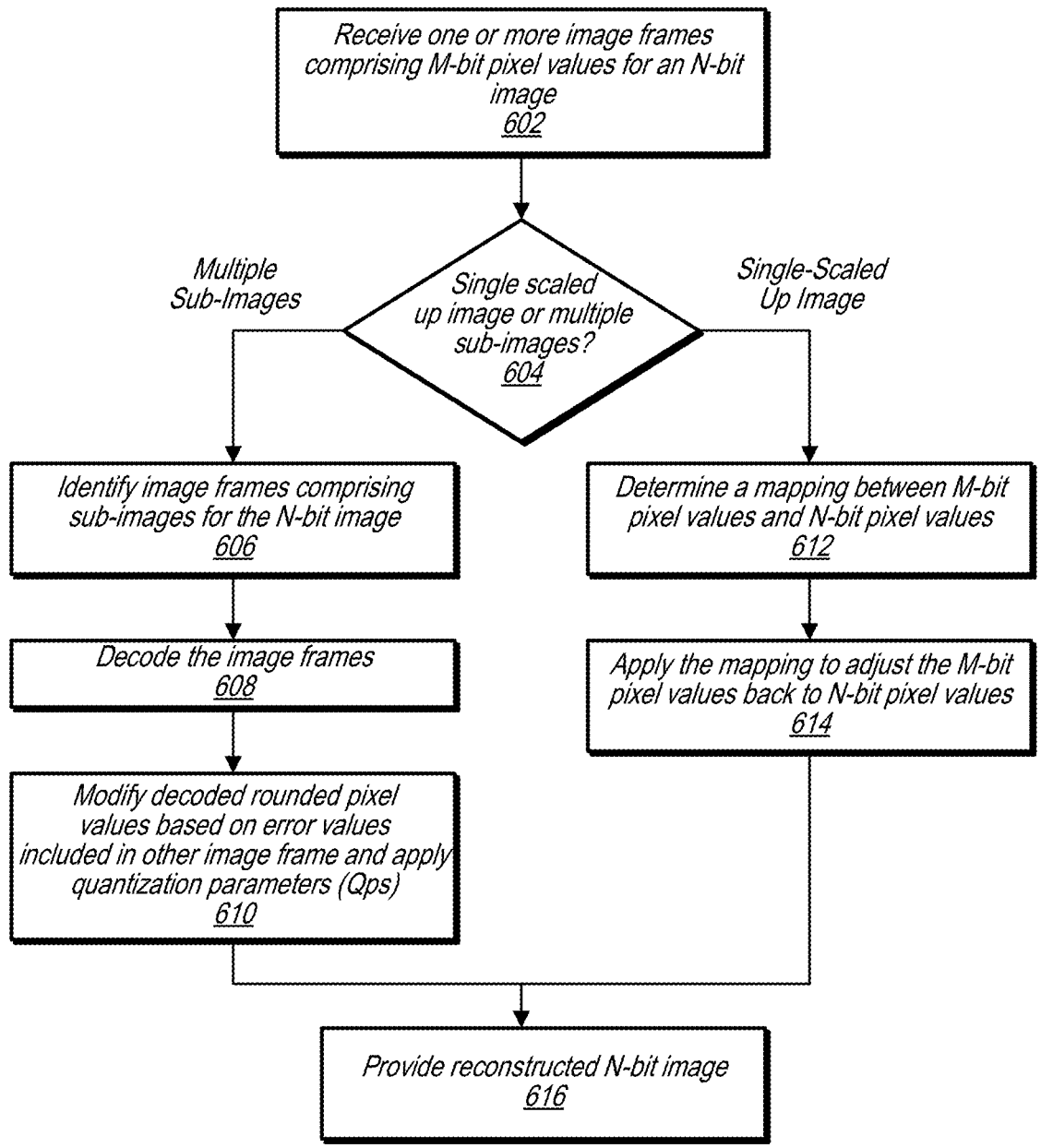
FIG. 6 illustrates a process of reconstructing an image with N-bit pixel values from one or more M-bit image frames, according to some embodiments.

FIG. 6 illustrates a process of reconstructing an image with N-bit pixel values from one or more M-bit image frames, according to some embodiments.

At 602, a decoder receives one or more image frames comprising M-bit pixel values that were encoded for an N-bit image.

At 604, the decoder determines whether the one or more image frames comprises a single scaled-up image (e.g. N<M) or whether the one or more image frames comprise multiple sub-images for the N-bit image (e.g. N>M).

If the bit stream includes multiple sub-images for the N-bit image (e.g. N>M), at 606, the decoder identifies the image frames comprising sub-images for the N-bit image and at 608 decodes the image frames. At 610, the decoder modifies the rounded pixel values expressed as M-bit values based on error values included in one or more of the sub-images. Additionally, the decoder may further apply quantization parameters to the modified pixel values.

If the bit stream includes a single scaled-up image for the N-bit image (e.g. N<M), at 612, the decoder determines a mapping and/or mapping ranges for mapping M-bit code words to N-bit pixel values. In some embodiments, the mapping/mapping ranges may be signaled to the decoder. In some embodiments, the encoder and decoder may use commonly known mappings/mapping ranges. In some embodiments, a decoder may infer mapping ranges based on other data.

At 614, the decoder applies the mappings/mapping ranges to adjust/convert the M-bit code words back into N-bit pixel values.

At 616, the decoder provides a reconstructed N-bit image either from the result of the modification of the rounded values at 610 or based on the modification of applying the mappings/mapping ranges at 614.

Example Implementations of Encoding N-Bit Images Via M-Bit Image Frames Using Code Word Mapping In many applications, there is a need to compress multi-level images, where the number of levels (e.g. possible pixel values) is commonly much lower than the number of levels that may be supported by the codec. There are also cases where the number of levels that are to be encoded may exceed the number of levels supported by the codec. Most codecs, for example, are built on the assumption that 8 bit or 10 bit images are to be encoded, and assume that usually up to 256 or 1024 levels (e.g. pixel values) respectively may be present in an image. On the other hand, it is common to encounter applications where fewer levels may need to be encoded. Example applications include binary map compression where each pixel can be either a 0 or a 1, and index map compression where each pixel can be an index value in the range of [0, N−1]. 16 bit depth information is also required in some applications and needs to be compressed using conventional codecs. Such compression may need to be lossless, but there are also cases where some loss may be tolerated, up to a certain degree.

In some embodiments, a system includes the following stages

Code word mapping. Each input pixel value is mapped to one or more M-bit code words, e.g. 8-bit or 10-bit code word.

Pre-processing. This optional step can make the images friendlier for compression.

Encode/decode. In principle any image/video codec can be used here, including H.264/AVC or H.265/HEVC, AV1, etc. Different profiles and coding tools could also be used in these codecs.

Post-processing. Decoded images are converted back to the original signal space with a mapping function.

Mapping function can be signaled as a side information, in-band or out-of-band from the compressed video data.

Code Word Mapping

Mapping of the N-Bit data to M-bit code words would depend on whether N<M.

If N<M, then there are several different options:
- a) scale the data by multiplying using a value $2^{(M-N-i)}$ (or equivalently shifting the data by (M−N−i) with $0<=i<=(M-N)$. Obviously when i=M−N, no scaling is performed.
- b) scale the data by multiplying using a value of $(2^{(M-i)}-1)$ and then dividing by $(2^{(N)}-1)$, with again $0<=i<=(M-N)$.
- c) scale the data by multiplying using a value of X with $(2^{(N)}-1)<X<=(2^{(M)}-1)$ and then dividing by $(2^{(N)}-1)$.

If N>M, then the original X is separated in several sub images of lower bit depth by processing each pixel x in that image as follows:

```
O = N - M
y_0 = (x + (1 << O)) >> (O + 1)
y_1 = x - (y_0 << (O + 1)) + (1 << O)
if (O > M) {
    P = O - M
    y_1 = (y_1 + (1 << P)) >> (P + 1)
    y_2 = x - (y_1 << (P + 1)) + (1 << P)
}
```

The above process repeats until all samples N have been assigned to a sub image of particular bit depth.

The above process repeats until all samples N have been assigned to a sub image of particular bit depth. Note that in this case rounding up is performed, so the reason why shifting by O+1 is performed is to ensure that there is not overflow in the MSB. It is not necessary for all sub images to use the same bit depth. Some images could use bit depth of 10 and others of 8, for example. Such order could be prefixed/predetermined and known at both the encoder and/or decoder, or determined at the encoder based, for example, on coding performance, and signaled to the decoder.

For example if N=16 and M=10, then
y_0=(x+(1<<6))>>7=(x+64)>>7
y_1=x−(y_0<<7)+64

If a codec is used to compress y_0, y_1, or any subsequent sub picture, a closed loop conversion could be used when generating these sub pictures. For example, after generating y_0, it can be compressed and the reconstructed image y_0_rec can be generated. Then y_1 could be generated as:
y_1=x−(y_0_rec<<(O+1))+(1<<O)

Instead of the earlier formulation, the same could be done for y_2, given the reconstruction of y_1, y_1_rec, and for any subsequent sub picture.

Pre-Processing

A spatial smoothing filter can be employed to smooth out the high frequencies associated with code word transitions. The smoothing filter can be designed to take into account unequal error cost. For instance if an error of coding 1→0 is higher than an error of coding of 0→1, the curve 704 may be preferred over the curve 702, in the example shown in FIG. 7.

The filter could be, for example a bilinear or bicubic filter, a cosine filter, a gaussian filter, a lanczos filter etc.

The idea behind this pre-processing is that when decoding, if a value above a normalized 0.5 value is encountered, then that would be decoded as a value of 1, whereas all other values will be interpreted as 0.

It should be noted that in the example shown in FIG. 7, the curve 702 could prevent ambiguity or leakage between values corresponding to 1 or 0 into their inverse value. Essentially, in this case a range of values can be defined that are not permitted to be generated by the filter so as to avoid ambiguity. The range does not need to be symmetric and a bias towards one end versus the other may be considered.

In some embodiments, spatio-temporal filters may be used to smooth out high frequencies in the temporal dimension, to make the signal friendlier to compress. Techniques in this category include 1) temporal smoothing filter and 2) a "temporal alignment" step to make sure the spatial-only filter mentioned above are consistent in the temporal dimension. The pre-processing stage could be easily extended to multi-level images.

Post Processing

Decoded images are converted back to the original signal space with a mapping function. The mapping function can be a one-to-one mapping, or a mapping based on contextual information.

One to one mapping may be similar to quantization, mapping input values from a large set to output values in a smaller set using non-overlapping intervals or quantization boundaries. The set of quantization boundaries can be fixed, or made adaptive and signaled to the decoder as side information.

With contextual information, error can be reduced under certain scenarios. Based on a set of spatial or spatio-temporal neighbors, a joint decision can be made on the current pixel based on voting. The voting strategies can include majority voting, linearly weighted averaging, non-linearly weighted averaging, or iterative refinement based on previous voting results.

Color Consideration

If a 4:2:0, 4:2:2, or 4:4:4 codec is used, both chroma channels can be set to neutral values (128 for 8 bit for example). However, any other value may also be used if desired. A monochrome codec could also be used.

In an alternative embodiment replicating or moving luma values in chroma may be performed. Replication might be useful if using a lossy coding scheme and since that could work as a multiple description coding scheme. In such a scenario errors could be corrected in the full resolution luma by looking at what happens also in the chroma planes. For 4:4:4 coding on the other hand the resolution could be reduced by half by making a 4:4:0 image (subsample horizontally or vertically the original image and placing some of the samples in the luma component and the others in one of the chroma components) and coding it. Replication of one of the components in the remaining color plane could also be possible or instead it could be specified that the last plane could contain a function between the other two planes, such as a difference of the other two planes, an XOR of the other two planes, their average etc. For example, if Y=x(i, 2j), Cb=(x, 2j+1) then we may select Cr=(x, 2j), Cr=(Y−Cb)+1, or Cr=XOR(Y, Cb).

Codec Considerations

The end-to-end distortion of the system can be defined as the distance between the input and output multi-level images. Encoder decisions can be made aware of the end-to-end distortion, instead of the commonly used distortion functions in regular video encoders. This include things like QP, motion estimation, mode decision, loop filter parameters, etc. As with pre-processing in such encoding process a distorted value can be permitted to be reconstructed to another value that after final processing would map to the same multi-level value. For example, if coding a value of 0.6, then this value could be encoded to any value >0.5 and essentially result in the same reconstruction as the original process (i.e. a value of 1). Processes such as motion estimation and mode decision could consider such mapping when performing coding decisions and for selecting the best predictor candidate/coding mode.

In some instances may be permitted to occur for a sample. That is a sample that originally corresponded to a level 10, is allowed to be changed to correspond to either level 11 or 12, if those were available. In a particular embodiment it may be permitted that any number of points in a particular layer change but it could also restrict such number of points. Restriction could also be independent per mapping value. E.g. for a binary image, we may wish to restrict differently the number of 1s that could be permitted to change to 0, and a different number of 0s permitted to change to 1. The shape and characteristics of the region we wish to encode could also be considered. Such information may be available also at the decoder, but could also be explicitly sent into the video signal.

Lossless Consideration

Additional considerations can be made, if the end goal is to provide a lossless coding on multi-level images. One way to achieve lossless is to find the maximal Qp for each block, that also can produce lossless reconstruction after quantization. Determination of the maximal QP could be based on a thorough search and coding evaluation of the current block, and/or could also be based on the characteristics of the current block and its prediction mode and/or residual information after prediction.

For bi-level images the XOR operator could be used to make data more sparse. We know, in particular that the XOR operator results in a value of 1 when samples are the same, and a 0 if the values are different. Using this property an occupancy map can be processed horizontally and/or vertically with the XOR operator. In particular, for every pixel in the image the pixel is updated as follows.

```
// horizontal processing
for (j=0; j < height; j++) {
    b(j,0) = a(j,0)
    for (i=0; i < width - 1; i++) {
        b(j,i+1) = xor(a(j,i), a(j,i+1));
    }
}
// vertical
for (i=0; i <width; i++) {
    c(0,i) = b( 0,i)
    for (j=0; j < height -1; j++) {
        c(j+1,i) = xor(b(j,i), b(j+1,i));
    }
}
```

Decoding could be performed in similar fashion and by backtracking the above conversion. For example, first decode the vertical samples using the following:

```
//vertical
for (i=0; i <width; i++) {
    d(0,i) = c(0, i)
    for (j=0; j < height -1; j++) {
        d(j+1,i) = xor(dd(j,i), c(j+1,i));
    }
}
// horizontal processing
for (j=0; j < height; j++) {
```

-continued

```
    e(j,0) = d(j,0)
    for (i=0; i < width - 1; i++) {
        e(j,i+1) = xor(e(j,i), d(j+1));
    }
}
c=b;
for j=1:320
    for i=1:319
        c(j,i+1) = xor(c(j,i), b(j,i+1));
    end
end
```

Example Point Cloud Compression Application for N-Bit to M-Bit Code Word Mapping In some embodiments, an encoder of a point cloud system may utilize code-word mapping as described above in regards to FIGS. 1-7, wherein N-bit pixel values are mapped to M-bit values. In some embodiments an encoder of a point cloud system may utilize such a technique to encode packed image frames and/or an occupancy map.

In some embodiments, a system may include a decoder that receives one or more sets of point cloud data comprising compressed attribute information via a network from a remote server or other storage device that stores the one or more point cloud files. For example, a 3-D display, a holographic display, or a head-mounted display may be manipulated in real-time or near real-time to show different portions of a virtual world represented by point clouds. In order to update the 3-D display, the holographic display, or the head-mounted display, a system associated with the decoder may request point cloud data from the remote server based on user manipulations of the displays, and the point cloud data may be transmitted from the remote server to the decoder and decoded by the decoder in real-time or near real-time. The displays may then be updated with updated point cloud data responsive to the user manipulations, such as updated point attributes.

In some embodiments, a system, may include one or more LIDAR systems, 3-D cameras, 3-D scanners, etc., and such sensor devices may capture spatial information, such as X, Y, and Z coordinates for points in a view of the sensor devices. In some embodiments, the spatial information may be relative to a local coordinate system or may be relative to a global coordinate system (for example, a Cartesian coordinate system may have a fixed reference point, such as a fixed point on the earth, or may have a non-fixed local reference point, such as a sensor location).

In some embodiments, such sensors may also capture attribute information for one or more points, such as color attributes, reflectivity attributes, velocity attributes, acceleration attributes, time attributes, modalities, and/or various other attributes. In some embodiments, other sensors, in addition to LIDAR systems, 3-D cameras, 3-D scanners, etc., may capture attribute information to be included in a point cloud. For example, in some embodiments, a gyroscope or accelerometer, may capture motion information to be included in a point cloud as an attribute associated with one or more points of the point cloud.

Example Point Cloud System Arrangement

Figure 8:
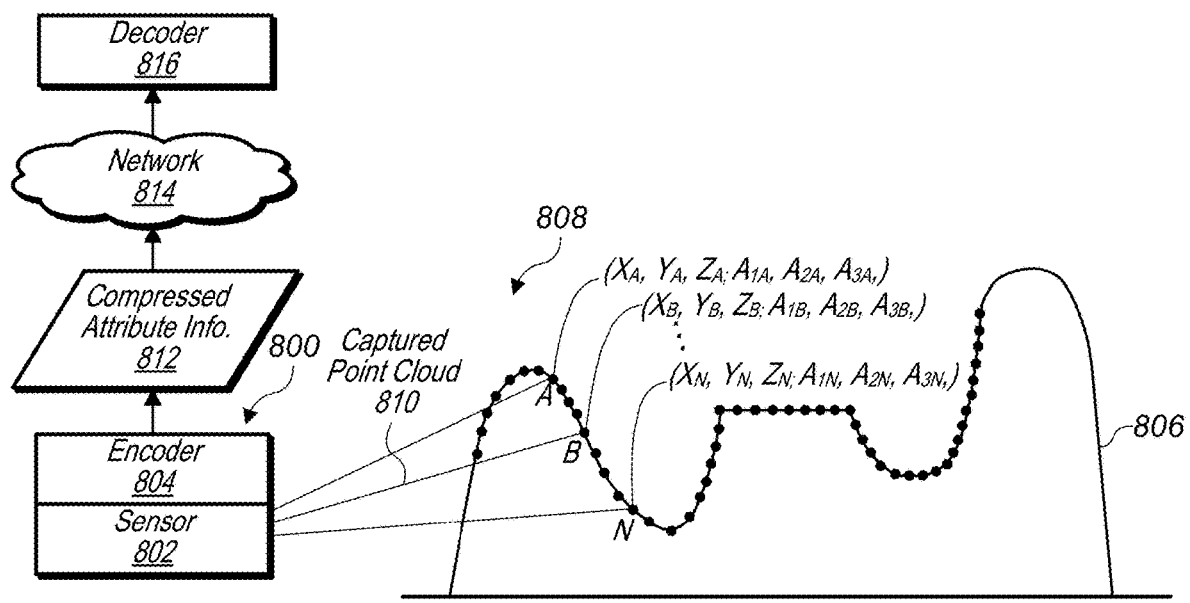
FIG. 8 illustrates a system comprising a sensor that captures information for points of a point cloud and an encoder that compresses spatial information and attribute information of the point cloud, where the compressed spatial and attribute information is sent to a decoder, according to some embodiments.

FIG. 8 illustrates a system comprising a sensor that captures information for points of a point cloud and an encoder that compresses attribute information of the point cloud, where the compressed attribute information is sent to a decoder, according to some embodiments.

System 800 includes sensor 802 and encoder 804. Sensor 802 captures a point cloud 810 comprising points representing structure 806 in view 808 of sensor 802. For example, in some embodiments, structure 806 may be a mountain range, a building, a sign, an environment surrounding a street, or any other type of structure. In some embodiments, a captured point cloud, such as captured point cloud 810, may include spatial and attribute information for the points included in the point cloud. For example, point A of captured point cloud 810 comprises X, Y, Z coordinates and attributes 1, 2, and 3. In some embodiments, attributes of a point may include attributes such as R, G, B color values, a velocity at the point, an acceleration at the point, a reflectance of the structure at the point, a time stamp indicating when the point was captured, a string-value indicating a modality when the point was captured, for example "walking", or other attributes. The captured point cloud 810 may be provided to encoder 804, wherein encoder 804 generates a compressed version of the point cloud (compressed attribute information 812) that is transmitted via network 814 to decoder 816. In some embodiments, a compressed version of the point cloud, such as compressed attribute information 812, may be included in a common compressed point cloud that also includes compressed spatial information for the points of the point cloud or, in some embodiments, compressed spatial information and compressed attribute information may be communicated as separate sets of data.

In some embodiments, encoder 804 may be integrated with sensor 802. For example, encoder 804 may be implemented in hardware or software included in a sensor device, such as sensor 802. In other embodiments, encoder 804 may be implemented on a separate computing device that is proximate to sensor 802.

Example Intra-Frame Encoder

Figure 9A:
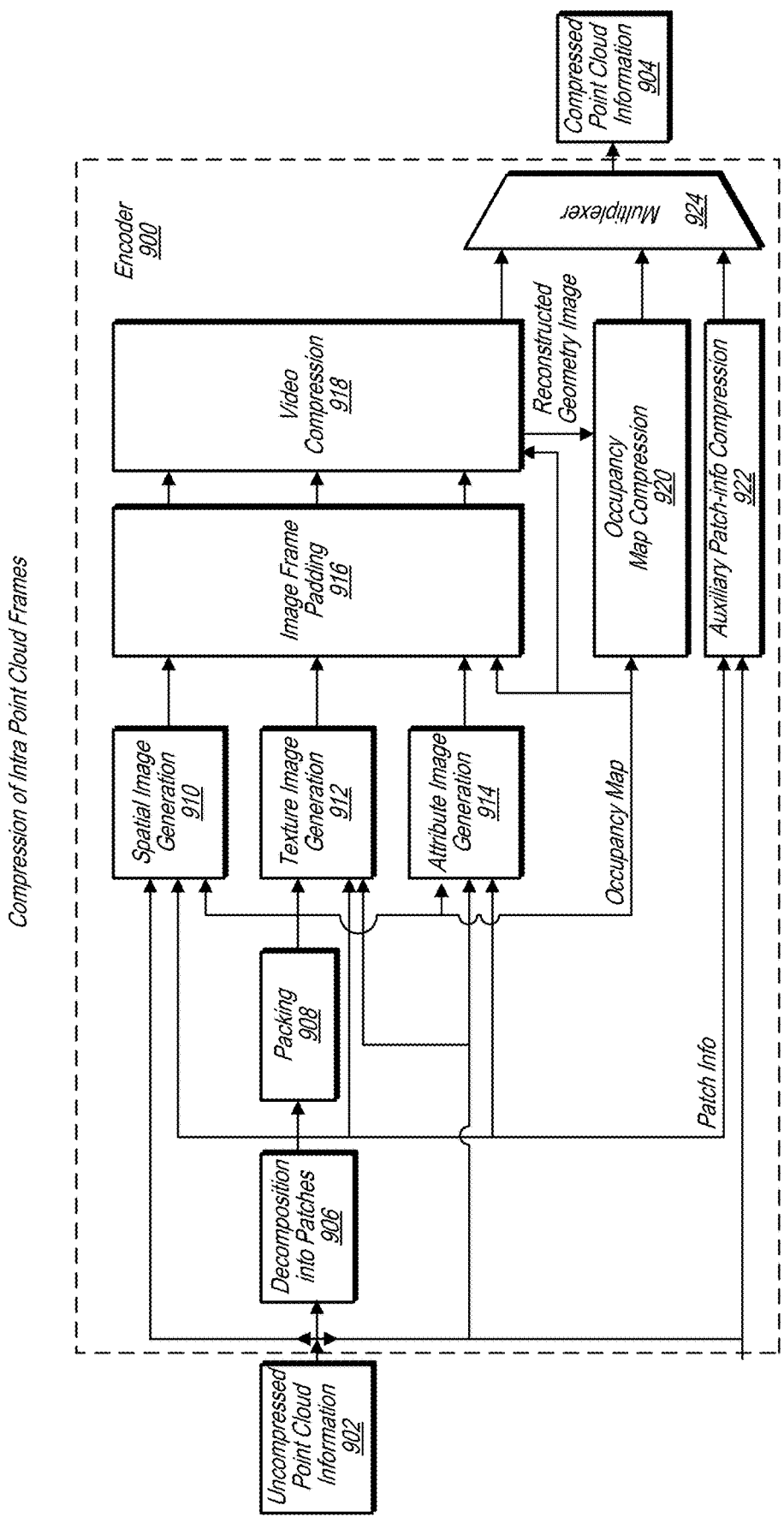
FIG. 9A illustrates components of an encoder for encoding intra point cloud frames, according to some embodiments.

FIG. 9A illustrates components of an encoder for encoding intra point cloud frames, according to some embodiments. In some embodiments, the encoder described above in regard to FIG. 8 may operate in a similar manner as encoder 900 described in FIG. 9A and encoder 950 described in FIG. 9C.

The encoder 900 receives uncompressed point cloud 902 and generates compressed point cloud information 904. In some embodiments, an encoder, such as encoder 900, may receive the uncompressed point cloud 902 from a sensor, such as sensor 802 illustrated in FIG. 8, or, in some embodiments, may receive the uncompressed point cloud 902 from another source, such as a graphics generation component that generates the uncompressed point cloud in software, as an example.

In some embodiments, an encoder, such as encoder 900, includes decomposition into patches module 906, packing module 908, spatial image generation module 910, texture image generation module 912, and attribute information generation module 914. In some embodiments, an encoder, such as encoder 900, also includes image frame padding module 916, video compression module 918 and multiplexer 924. In addition, in some embodiments an encoder, such as encoder 900, may include an occupancy map compression module, such as occupancy map compression module 920, and an auxiliary patch information compression module, such as auxiliary patch information compression module 922. In some embodiments, an encoder, such as encoder 900, converts a 3D point cloud into an image-based representation along with some meta data (e.g., occupancy map and patch info) necessary to convert the compressed point cloud back into a decompressed point cloud.

In some embodiments, the conversion process decomposes the point cloud into a set of patches (e.g., a patch is defined as a contiguous subset of the surface described by the point cloud), which may be overlapping or not, such that each patch may be described by a depth field with respect to a plane in 2D space. More details about the patch decomposition process are provided above with regard to FIGS. 10A-10C.

After or in conjunction with the patches being determined for the point cloud being compressed, a 2D sampling process is performed in planes associated with the patches. The 2D sampling process may be applied in order to approximate each patch with a uniformly sampled point cloud, which may be stored as a set of 2D patch images describing the geometry/texture/attributes of the point cloud at the patch location. The "Packing" module 908 may store the 2D patch images associated with the patches in a single (or multiple) 2D images, referred to herein as "image frames" or "video image frames." In some embodiments, a packing module, such as packing module 908, may pack the 2D patch images such that the packed 2D patch images do not overlap (even though an outer bounding box for one patch image may overlap an outer bounding box for another patch image). Also, the packing module may pack the 2D patch images in a way that minimizes non-used images pixels of the image frame.

In some embodiments, "Geometry/Texture/Attribute generation" modules, such as modules 910, 912, and 914, generate 2D patch images associated with the geometry/texture/attributes, respectively, of the point cloud at a given patch location. As noted before, a packing process, such as performed by packing module 908, may leave some empty spaces between 2D patch images packed in an image frame. Also, a padding module, such as image frame padding module 916, may fill in such areas in order to generate an image frame that may be suited for 2D video and image codecs.

In some embodiments, an occupancy map (e.g., binary information describing for each pixel or block of pixels whether the pixel or block of pixels are padded or not) may be generated and compressed, for example by occupancy map compression module 920. The occupancy map may be sent to a decoder to enable the decoder to distinguish between padded and non-padded pixels of an image frame.

Note that other metadata associated with patches may also be sent to a decoder for use in the decompression process. For example, patch information indicating sizes and shapes of patches determined for the point cloud and packed in an image frame may be generated and/or encoded by an auxiliary patch-information compression module, such as auxiliary patch-information compression module 922. In some embodiments one or more image frames may be encoded by a video encoder, such as video compression module 918. In some embodiments, a video encoder, such as video compression module 918, may operate in accordance with the High Efficiency Video Coding (HEVC) standard or other suitable video encoding standard. In some embodiments, encoded video images, encoded occupancy map information, and encoded auxiliary patch information may be multiplexed by a multiplexer, such as multiplexer 924, and provided to a recipient as compressed point cloud information, such as compressed point cloud information 904.

In some embodiments, an occupancy map may be encoded and decoded by a video compression module, such as video compression module 918. This may be done at an encoder, such as encoder 900, such that the encoder has an accurate representation of what the occupancy map will look like when decoded by a decoder. Also, variations in image frames due to lossy compression and decompression may be accounted for by an occupancy map compression module, such as occupancy map compression module 920, when determining an occupancy map for an image frame.

In some embodiments, a video compression module, such as video compression module 918, may employ code-word mapping to encode N-bit images via one or more M-bit image frames, as described above in regard to FIGS. 1-7.

Example Intra-Frame Decoder

Figure 9B:
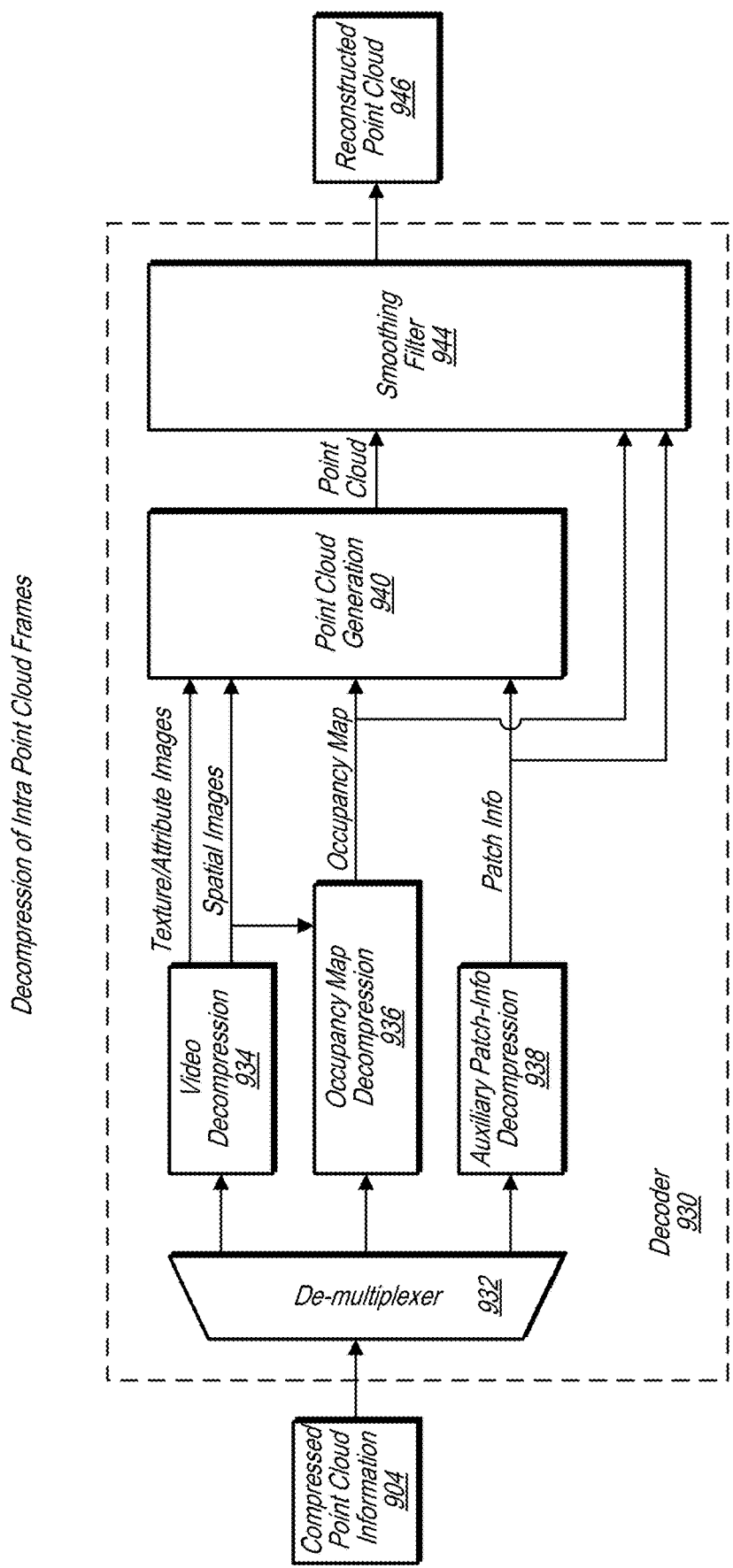
FIG. 9B illustrates components of a decoder for decoding intra point cloud frames, according to some embodiments.

FIG. 9B illustrates components of a decoder for decoding intra point cloud frames, according to some embodiments. Decoder 930 receives compressed point cloud information 904, which may be the same compressed point cloud information 904 generated by encoder 900. Decoder 930 generates reconstructed point cloud 946 based on receiving the compressed point cloud information 904.

In some embodiments, a decoder, such as decoder 930, includes a de-multiplexer 932, a video decompression module 934, an occupancy map decompression module 936, and an auxiliary patch-information decompression module 938. In some embodiments, video decompression module 934 may employ code-word mapping to decode M-bit image frames to generate N-bit images, as described above in regard to FIGS. 1-7.

Additionally a decoder, such as decoder 930 includes a point cloud generation module 940, which reconstructs a point cloud based on patch images included in one or more image frames included in the received compressed point cloud information, such as compressed point cloud information 904. In some embodiments, a decoder, such as decoder 903, further comprises a smoothing filter, such as smoothing filter 944. In some embodiments, a smoothing filter may smooth incongruences at edges of patches, wherein data included in patch images for the patches has been used by the point cloud generation module to recreate a point cloud from the patch images for the patches. In some embodiments, a smoothing filter may be applied to the pixels located on the patch boundaries to alleviate the distortions that may be caused by the compression/decompression process.

Example Inter-Frame Encoder

Figure 9C:
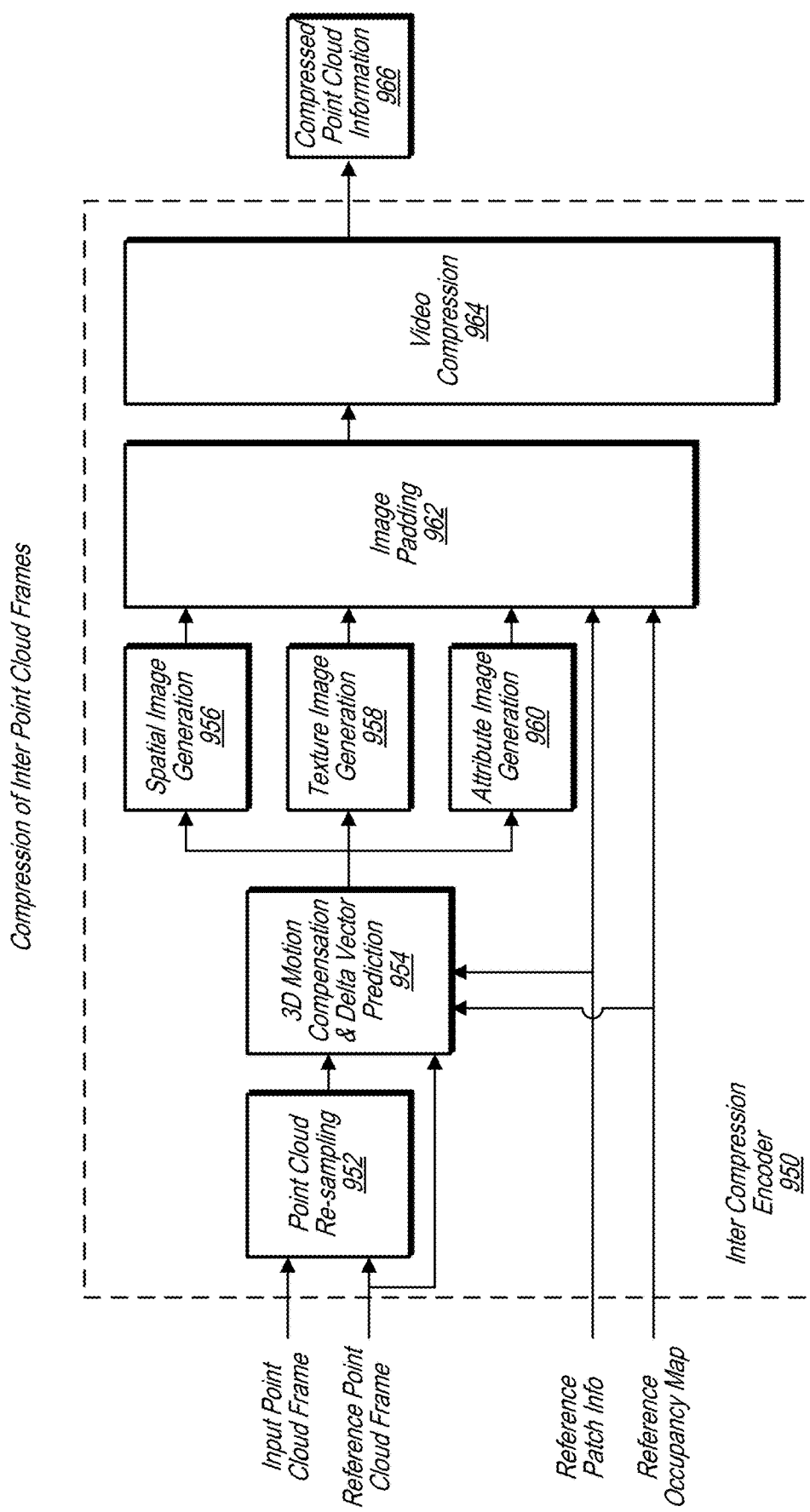
FIG. 9C illustrates components of an encoder for encoding inter point cloud frames, according to some embodiments.

FIG. 9C illustrates components of an encoder for encoding inter point cloud frames, according to some embodiments. An inter point cloud encoder, such as inter point cloud encoder 950, may encode an image frame, while considering one or more previously encoded/decoded image frames as references.

In some embodiments, an encoder for inter point cloud frames, such as encoder 950, includes a point cloud re-sampling module 952, a 3-D motion compensation and delta vector prediction module 954, a spatial image generation module 956, a texture image generation module 958, and an attribute image generation module 960. In some embodiments, an encoder for inter point cloud frames, such as encoder 950, may also include an image padding module 962 and a video compression module 964. An encoder for inter point cloud frames, such as encoder 950, may generate compressed point cloud information, such as compressed point cloud information 966. In some embodiments, the compressed point cloud information may reference point cloud information previously encoded by the encoder, such as information from or derived from one or more reference image frames. In this way an encoder for inter point cloud frames, such as encoder 950, may generate more compact compressed point cloud information by not repeating information included in a reference image frame, and instead communicating differences between the reference frames and a current state of the point cloud.

In some embodiments, an encoder, such as encoder 950, may be combined with or share modules with an intra point cloud frame encoder, such as encoder 900. In some embodiments, a point cloud re-sampling module, such as point cloud re-sampling module 952, may resample points in an input point cloud image frame in order to determine a one-to-one mapping between points in patches of the current image frame and points in patches of a reference image frame for the point cloud. In some embodiments, a 3D motion compensation & delta vector prediction module, such as a 3D motion compensation & delta vector prediction module 954, may apply a temporal prediction to the geometry/texture/attributes of the resampled points of the patches. The prediction residuals may be stored into images, which may be padded and compressed by using video/image codecs. In regard to spatial changes for points of the patches between the reference frame and a current frame, a 3D motion compensation & delta vector prediction module 954, may determine respective vectors for each of the points indicating how the points moved from the reference frame to the current frame. A 3D motion compensation & delta vector prediction module 954, may then encode the motion vectors using different image parameters. For example, changes in the X direction for a point may be represented by an amount of red included at the point in a patch image that includes the point. In a similar manner, changes in the Y direction for a point may be represented by an amount of blue included at the point in a patch image that includes the point. Also, in a similar manner, changes in the Z direction for a point may be represented by an amount of green included at the point in a patch image that includes the point. In some embodiments, other characteristics of an image included in a patch image may be adjusted to indicate motion of points included in the patch between a reference frame for the patch and a current frame for the patch.

Example Inter-Frame Decoder

Figure 9D:
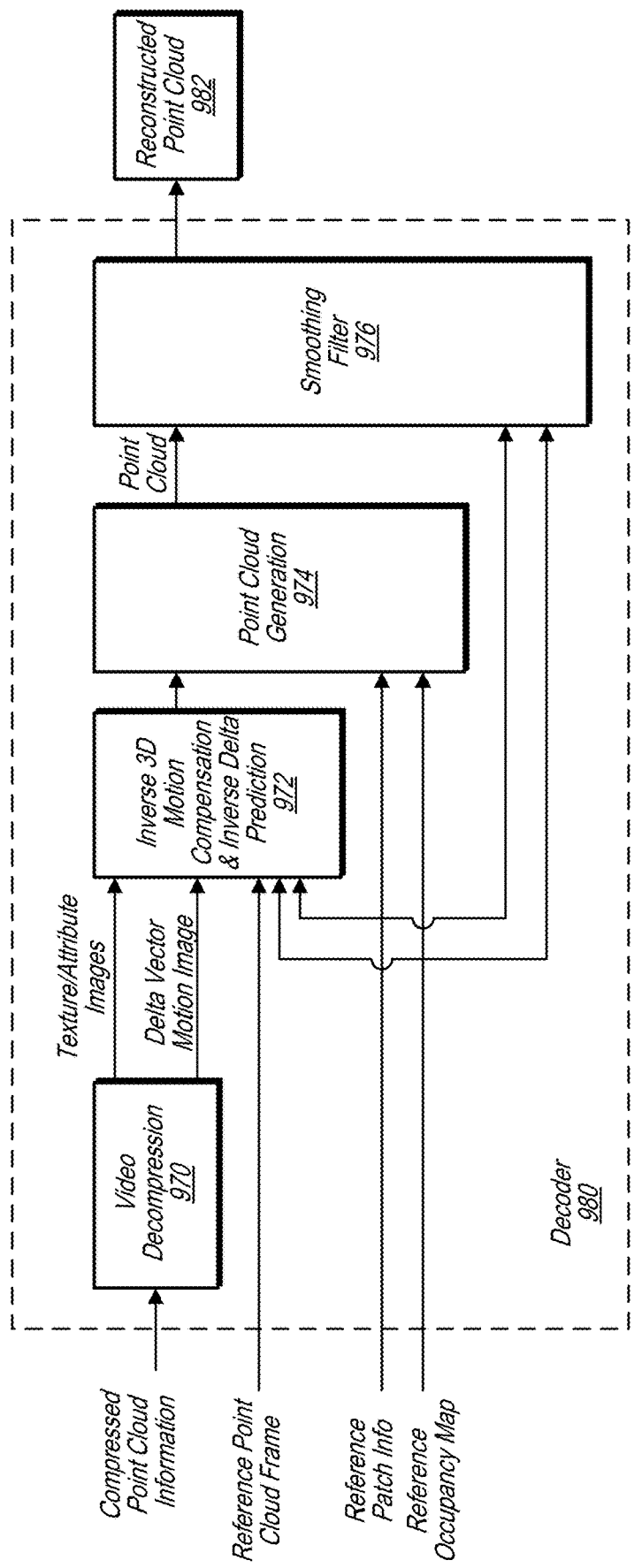
FIG. 9D illustrates components of a decoder for decoding inter point cloud frames, according to some embodiments.

FIG. 9D illustrates components of a decoder for decoding inter point cloud frames, according to some embodiments. In some embodiments, a decoder, such as decoder 980, includes a video decompression module 970, an inverse 3D motion compensation and inverse delta prediction module 972, a point cloud generation module 974, and a smoothing filter 976. In some embodiments, video decompression module 970 may employ code-word mapping to decode M-bit image frames to generate N-bit images, as described above in regard to FIGS. 1-7. In some embodiments, a decoder, such as decoder 980 may be combined with a decoder, such as decoder 930, or may share some components with the decoder, such as a video decompression module and/or smoothing filter. In decoder 980, the video/image streams are first decoded, then an inverse motion compensation and delta prediction procedure may be applied. The obtained images are then used in order to reconstruct a point cloud, which may be smoothed as described previously to generate a reconstructed point cloud 982.

Segmentation Process

Figure 10A:
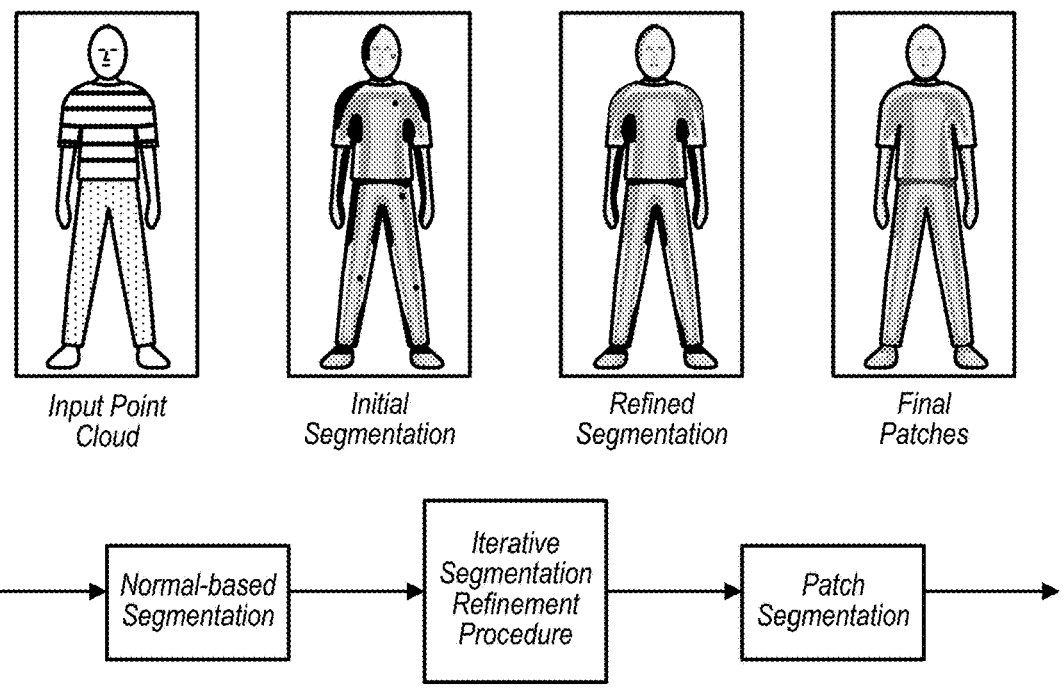
FIG. 10A illustrates an example patch segmentation process, according to some embodiments.

FIG. 10A illustrates an example segmentation process for determining patches for a point cloud, according to some embodiments. The segmentation process as described in FIG. 10A may be performed by a decomposition into patches module, such as decomposition into patches module 906. A segmentation process may decompose a point cloud into a minimum number of patches (e.g., a contiguous subset of the surface described by the point cloud), while making sure that the respective patches may be represented by a depth field with respect to a patch plane. This may be done without a significant loss of shape information.

In some embodiments, a segmentation process comprises:

Letting point cloud PC be the input point cloud to be partitioned into patches and {P(0), P(1) . . . , P(N-1)} be the positions of points of point cloud PC.

In some embodiments, a fixed set D={D(0), D(1), . . . , D(K-1)} of K 3D orientations is pre-defined. For instance, D may be chosen as follows D={(1.0, 0.0, 0.0), (0.0, 1.0, 0.0), (0.0, 0.0, 1.0), (-1.0, 0.0, 0.0), (0.0, -1.0, 0.0), (0.0, 0.0, -1.0)}

In some embodiments, the normal vector to the surface at every point P(i) is estimated. Any suitable algorithm may be used to determine the normal vector to the surface. For instance, a technique could include fetching the set H of the "N" nearest points of P(i), and fitting a plane Π(i) to H(i) by using principal component analysis techniques. The normal to P(i) may be estimated by taking the normal ∇(i) to Π(i). Note that "N" may be a user-defined parameter or may be found by applying an optimization procedure. "N" may also be fixed or adaptive. The normal values may then be oriented consistently by using a minimum-spanning tree approach.

Normal-based Segmentation: An initial segmentation S0 of the points of point cloud PC may be obtained by associating respective points with the direction D(k) which maximizes the score $\langle \nabla(i)|D(k)\rangle$, where $\langle .|.\rangle$ is the canonical dot product of R3. Pseudo code is provided below.

```
for (i = 0; i < pointCount; ++i) {
    clusterIndex = 0;
    bestScore = ⟨∇(i)|D(0)⟩;
    for(j = 1; j < K; ++j) {
        score = ⟨∇(i)|D(j)⟩;
        if (score > bestScore) {
            bestScore = score;
            clusterIndex = j;
        }
    }
    partition[i] = clusterIndex;
}
```

Iterative segmentation refinement: Note that segmentation S0 associates respective points with the plane Π(i) that best preserves the geometry of its neighborhood (e.g. the neighborhood of the segment). In some circumstances, segmentation S0 may generate too many small connected components with irregular boundaries, which may result in poor compression performance. In order to avoid such issues, the following iterative segmentation refinement procedure may be applied:

1. An adjacency graph A may be built by associating a vertex V(i) to respective points P(i) of point cloud PC and by adding R edges {E(i,j(0)), . . . , EN(R-1)} connecting vertex V(i) to its nearest neighbors {V(j(0)), V(j(1)), . . . , V(j(R-1))}. More precisely, {V(j(0)), V(j(1)), . . . , V(j(R-1))} may be the vertices associated with the points {P(j(0)), P(j(1)), . . . , P(j(R-1))}, which may be the nearest neighbors of P(i). Note that R may be a user-defined parameter or may be found by applying an optimization procedure. It may also be fixed or adaptive.

2. At each iteration, the points of point cloud PC may be traversed and every vertex may be associated with the direction D(k) that maximizes $$\left(\langle \nabla(i)|D(k)\rangle + \frac{\lambda}{R}|\zeta(i)|\right),$$

where $|\zeta(i)|$ is the number of the R-nearest neighbors of V(i) belonging to the same cluster and λ is a parameter controlling the regularity of the produced patches. Note that the parameters λ and R may be defined by the user or may be determined by applying an optimization procedure. They may also be fixed or adaptive. In some embodiments, a "user" as referred to herein may be an engineer who configured a point cloud compression technique as described herein to one or more applications.

3. An example of pseudo code is provided below

```
for(l = 0; l < iterationCount; ++l) {
    for(i = 0; i <pointCount; ++i) {
        clusterIndex = partition[i];
        bestScore = 0.0;
        for(k = 0; k < K; ++k) {
            score = ⟨∇(i)|D(k)⟩;
            for(j ∈ {j(0), j(1), . . . , j(R - 1)}) {
                if (k == partition[j]) {
                    score += λ/R;
                }
            }
            if (score > bestScore) {
                bestScore = score;
                clusterIndex = k;
            }
        }
        partition[i] = clusterIndex;
    }
}
```

In some embodiments, the pseudo code shown above may further include an early termination step. For example, if a score that is a particular value is reached, or if a difference between a score that is reached and a best score only changes by a certain amount or less, the search could be terminated early. Also, the search could be terminated if after a certain number of iterations (1=m), the clusterindex does not change.

Patch segmentation: In some embodiments, the patch segmentation procedure further segments the clusters detected in the previous steps into patches, which may be represented with a depth field with respect to a projection plane. The approach proceeds as follows, according to some embodiments:

1. First, a cluster-based adjacency graph with a number of neighbors R' is built, while considering as neighbors only the points that belong to the same cluster. Note that R' may be different from the number of neighbors R used in the previous steps.

2. Next, the different connected components of the cluster-based adjacency graph are extracted. Only connected components with a number of points higher than a parameter α are considered. Let CC={CC(0), CC(1), . . . , CC(M-1)} be the set of the extracted connected components.

3. Respective connected component CC(m) inherits the orientation D(m) of the cluster it belongs to. The points of CC(m) are then projected on a projection plane having as normal the orientation D(m), while updating a depth map, which records for every pixel the depth of the nearest point to the projection plane.

4. An approximated version of CC(m), denoted C'(m), is then built by associating respective updated pixels of the depth map with a 3D point having the same depth. Let PC' be the point cloud obtained by the union of reconstructed connected components {CC'(0), CC'(1), ..., CC'(M−1)}

5. Note that the projection reconstruction process may be lossy and some points may be missing. In order, to detect such points, every point P(i) of point cloud PC may be checked to make sure it is within a distance lower than a parameter δ from a point of PC'. If this is not the case, then P(i) may be marked as a missed point and added to a set of missed points denoted MP.

6. The steps 2-5 are then applied to the missed points MP. The process is repeated until MP is empty or CC is empty. Note that the parameters δ and α may be defined by the user or may be determined by applying an optimization procedure. They may also be fixed or adaptive.

7. A filtering procedure may be applied to the detected patches in order to make them better suited for compression. Example filter procedures may include:
   a. A smoothing filter based on the geometry/texture/attributes of the points of the patches (e.g., median filtering), which takes into account both spatial and temporal aspects.
   b. Discarding small and isolated patches.
   c. User-guided filtering.
   d. Other suitable smoothing filter techniques.

Packing

In some embodiments, depth maps associated with patches, also referred to herein as "depth patch images," such as those described above, may be packed into a 2D image frame. For example, a packing module, such as packing module 908, may pack depth patch images generated by a spatial image generation module, such as spatial image generation module 910. The depth maps, or depth patch images, may be packed such that (A) no non-overlapping block of T×T pixels contains depth information from two different patches and such that (B) a size of the generated image frame is minimized.

In some embodiments, packing comprises the following steps:
   a. The patches are sorted by height and then by width. The patches are then inserted in image frame (I) one after the other in that order. At each step, the pixels of image frame (I) are traversed in raster order, while checking if the current patch could be inserted under the two conditions (A) and (B) described above. If it is not possible then the height of (I) is doubled.
   b. This process is iterated until all the patches are inserted.

In some embodiments, the packing process described above may be applied to pack a subset of the patches inside multiples tiles of an image frame or multiple image frames. This may allow patches with similar/close orientations based on visibility according to the rendering camera position to be stored in the same image frame/tile, to enable view-dependent streaming and/or decoding. This may also allow parallel encoding/decoding.

In some embodiments, the packing process can be considered a bin-packing problem and a first decreasing strategy as described above may be applied to solve the bin-packing problem. In other embodiments, other methods such as the modified first fit decreasing (MFFD) strategy may be applied in the packing process.

In some embodiments, if temporal prediction is used, such as described for inter compression encoder 950, such an optimization may be performed with temporal prediction/encoding in addition to spatial prediction/encoding. Such consideration may be made for the entire video sequence or per group of pictures (GOP). In the latter case additional constraints may be specified. For example, a constraint may be that the resolution of the image frames should not exceed a threshold amount. In some embodiments, additional temporal constraints may be imposed, even if temporal prediction is not used, for example such as that a patch corresponding to a particular object view is not moved more than x number of pixels from previous instantiations.

Figure 10B:
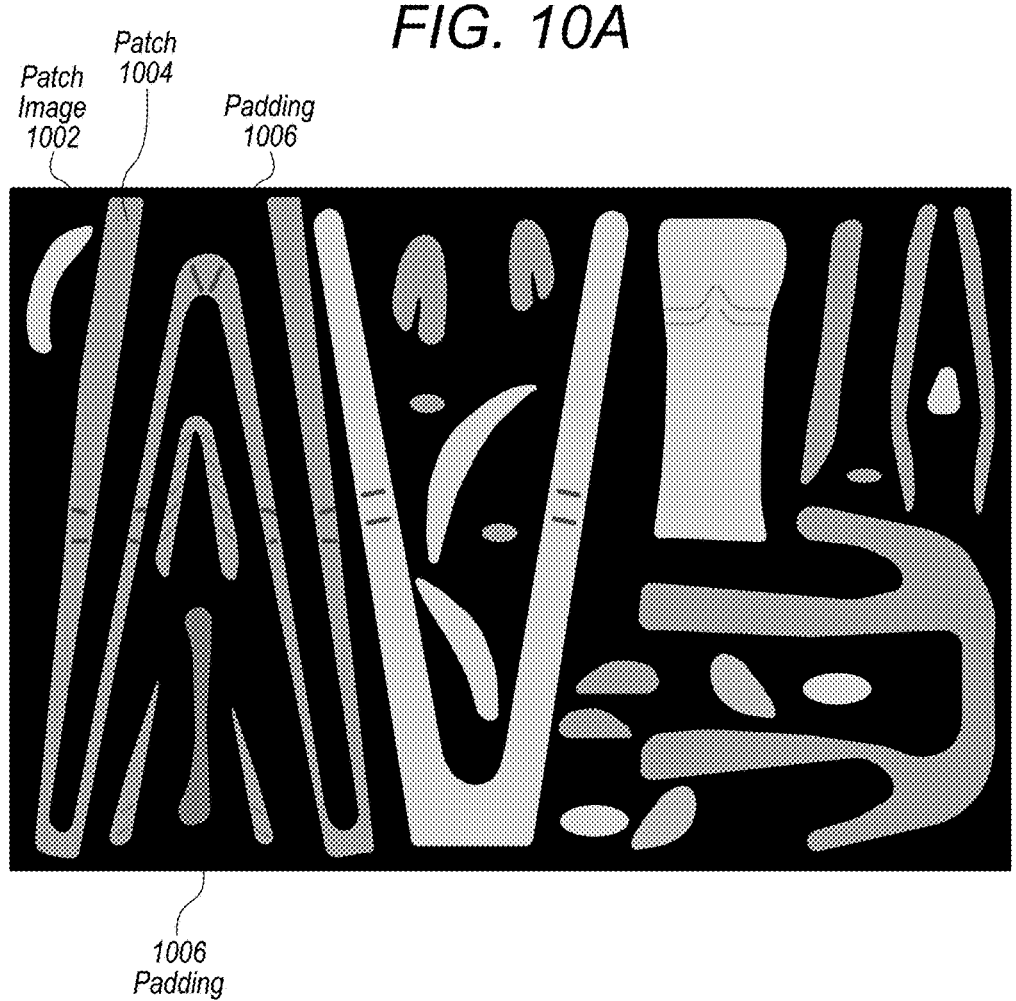
FIG. 10B illustrates an example image frame comprising packed patch images and padded portions, according to some embodiments.

FIG. 10B illustrates an example image frame comprising packed patch images and padded portions, according to some embodiments. Image frame 1000 includes patch images 1002 packed into image frame 1000 and also includes padding 1004 in space of image frame 1000 not occupied by patch images. In some embodiments, padding, such as padding 1004, may be determined so as to minimize incongruences between a patch image and the padding. For example, in some embodiments, padding may construct new pixel blocks that are replicas of, or are to some degree similar to, pixel blocks that are on the edges of patch images. Because an image and/or video encoder may encode based on differences between adjacent pixels, such an approach may reduce the number of bytes required to encode an image frame comprising of patch images and padding, in some embodiments.

In some embodiments, the patch information may be stored in the same order as the order used during the packing, which makes it possible to handle overlapping 2D bounding boxes of patches. Thus a decoder receiving the patch information can extract patch images from the image frame in the same order in which the patch images were packed into the image frame. Also, because the order is known by the decoder, the decoder can resolve patch image bounding boxes that overlap.

Figure 10C:
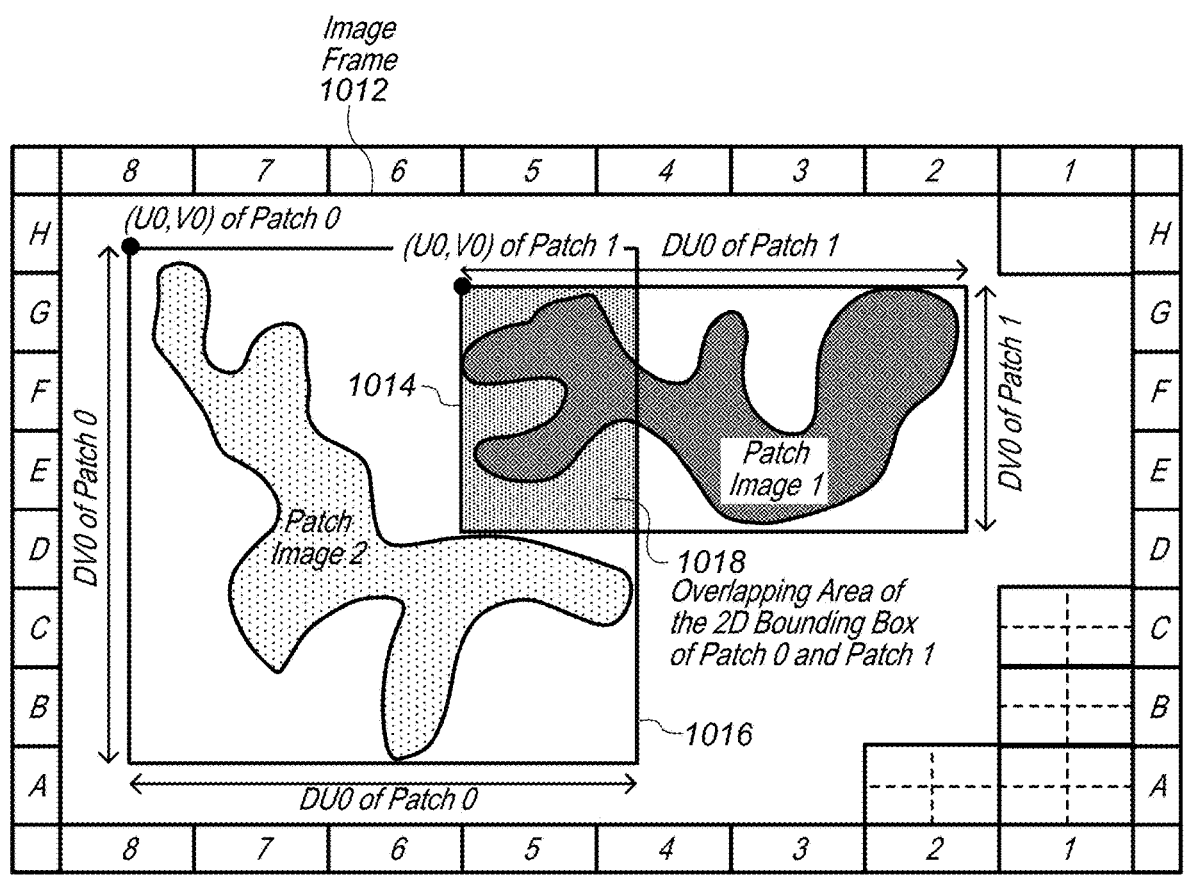
FIG. 10C illustrates an example image frame comprising patch portions and padded portions, according to some embodiments.

FIG. 10C illustrates an example image frame 1012 with overlapping patches, according to some embodiments. FIG. 10C shows an example with two patches (patch image 1 and patch image 2) having overlapping 2D bounding boxes 1014 and 1016 that overlap at area 1018. In order to determine to which patch the T×T blocks in the area 1018 belong, the order of the patches may be considered. For example, the T×T block 1014 may belong to the last decoded patch. This may be because in the case of an overlapping patch, a later placed patch is placed such that it overlaps with a previously placed patch. By knowing the placement order it can be resolved that areas of overlapping bounding boxes go with the latest placed patch. In some embodiments, the patch information is predicted and encoded (e.g., with an entropy/arithmetic encoder). Also, in some embodiments, U0, V0, DU0 and DV0 are encoded as multiples of T, where T is the block size used during the padding phase.

FIG. 10C also illustrates blocks of an image frame 1012, wherein the blocks may be further divided into sub-blocks. For example block A1, B1, C1, A2, etc. may be divided into multiple sub-blocks, and, in some embodiments, the sub-blocks may be further divided into smaller blocks. In some embodiments, a video compression module of an encoder, such as video compression module 918 or video compression module 964, may determine whether a block comprises active pixels, non-active pixels, or a mix of active and non-active pixels. The video compression module may budget fewer resources to compress blocks comprising non-active pixels than an amount of resources that are budgeted for encoding blocks comprising active pixels. In some embodiments, active pixels may be pixels that include data for a patch image and non-active pixels may be pixels that include padding. In some embodiments, a video compression module may sub-divide blocks comprising both active and non-active pixels, and budget resources based on whether sub-blocks of the blocks comprise active or non-active pixels. For example, blocks A1, B1, C1, A2 may comprise non-active pixels. As another example block E3 may comprise active pixels, and block B6, as an example, may include a mix of active and non-active pixels.

Example Methods of Compressing and Decompressing Point Clouds

Figure 11A:
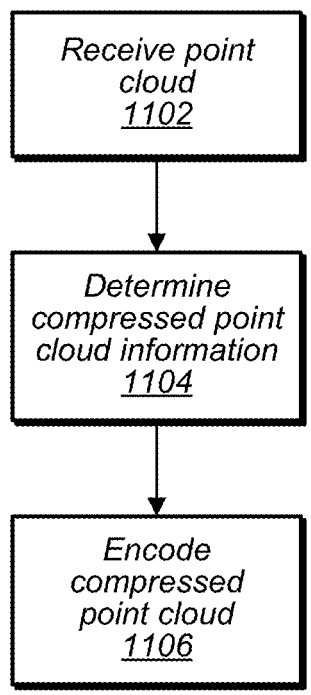
FIG. 11A illustrates a process for compressing attribute and spatial information of a point cloud, according to some embodiments.

FIG. 11A illustrates a process for compressing attribute and spatial information of a point cloud, according to some embodiments.

At 1102, a point cloud is received by an encoder. The point cloud may be captured, for example by one or more sensors, or may be generated, for example in software.

At 1104, compressed point cloud information is determined, using any of the techniques described herein or using one more combinations of the techniques described herein.

At 1106, a compressed point cloud is encoded using the compressed point cloud information determined at 1104. The point cloud may be compressed using any of the techniques described herein.

Figure 11B:
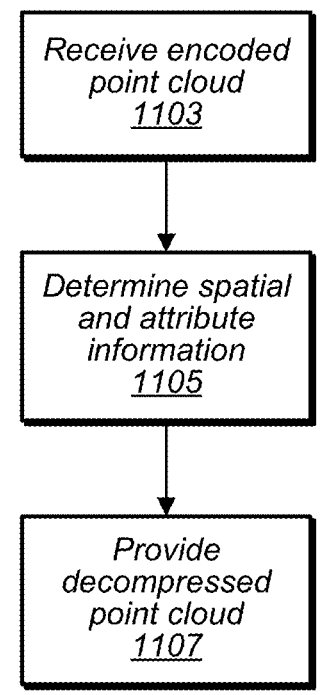
FIG. 11B illustrates a process for decompressing attribute and spatial information of a point cloud, according to some embodiments.

FIG. 11B illustrates a process for decompressing attribute and spatial information of a point cloud, according to some embodiments.

At 1103 an encoded point cloud is received. The point cloud may have been encoded using any of the encoding techniques described herein, such as patch images packed into an image frame that is then encoded by a video encoder. In some embodiments, the encoded point cloud may comprise point cloud projections, such as projections onto a cube, cylinder, sphere, etc. that are then encoded via a video encoder.

At 1105, spatial and attribute information for the encoded point cloud is determined. For example, a video decoder may be used to decode video encoded packed images or projects. Spatial information may then be determined based on the packed images or projections and combined to determine spatial information for points of the point cloud. For example, depth information for points of a patch may be matched with X and Y information for the points of the patch to determine spatial information for the points of the patch in 3D space. In a similar manner other attributes, included in patch images such as color attributes, texture attributes, etc. may be matched with corresponding points to determine attribute values for the points. Also, in the case of multiple projections, the same point may be identified in more than one of the projections to determine spatial information for the point in 3D space.

At 1107, a decompressed point cloud may be provided to a recipient device or module.

Figure 11C:
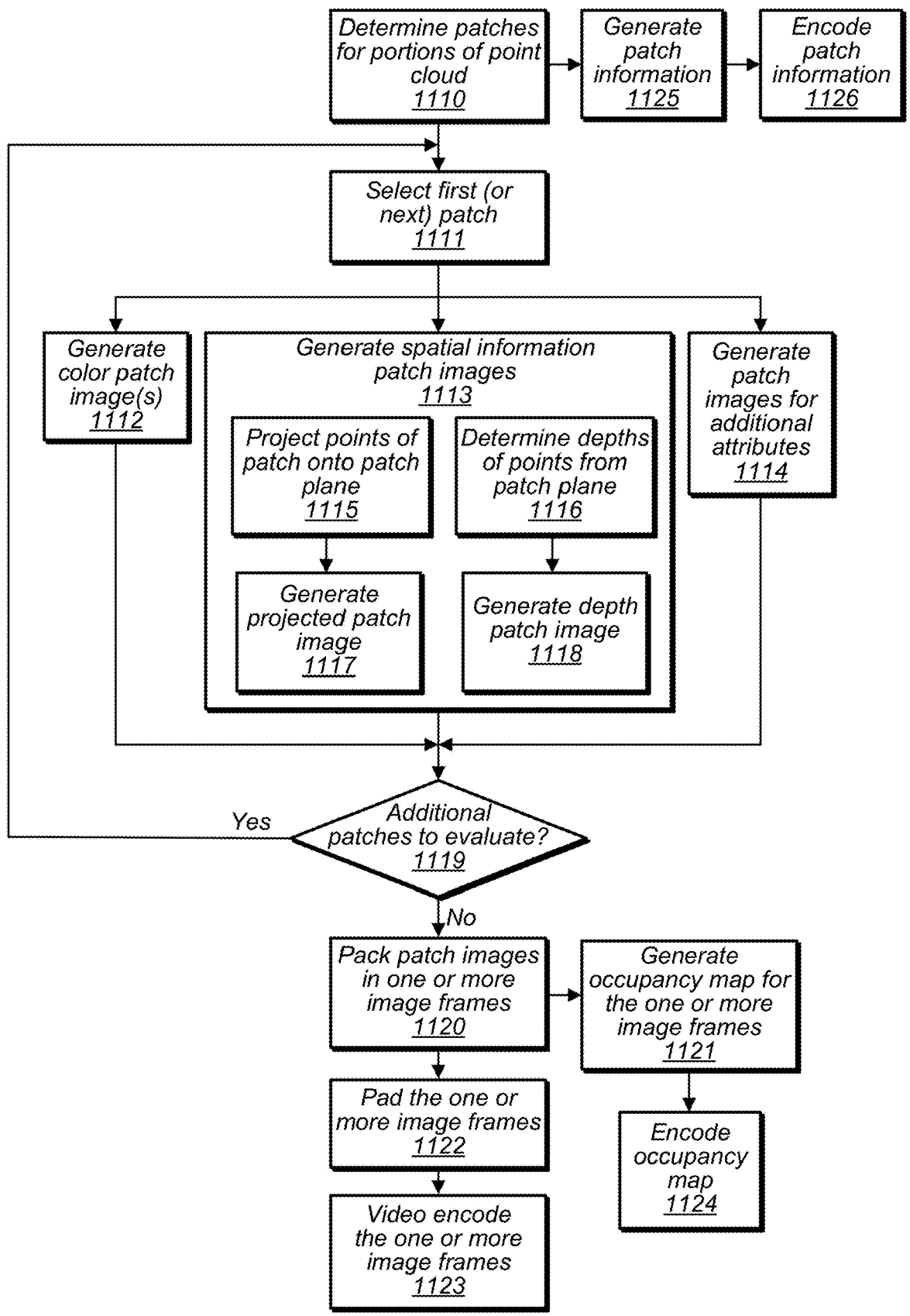
FIG. 11C illustrates patch images being generated and packed into an image frame to compress attribute and spatial information of a point cloud, according to some embodiments.

FIG. 11C illustrates patch images being generated and packed into an image frame to compress attribute and spatial information of a point cloud, according to some embodiments.

At 1110, patches are determined for portions of point cloud. For example patches may be determined as described above. At 1125 patch information for the patches may be generated and at 1126, may be encoded to be sent to a decoder. In some embodiments, encoded patch information may be separately encoded from one or more image frames comprising packed patch images.

At 1111, a first patch (or next patch is selected). At 1112 a color (e.g. attribute) patch image is generated for the points of the point cloud included in the patch. At 1114, one or more additional attribute images, such as a texture attribute image, are generated for the points of the point cloud included in the patch.

At 1113, spatial information images are generated for the points of the point cloud included in the patch. In some embodiments, to generate the spatial information images, the points of the point cloud are projected, at 1115, onto a patch plane perpendicular to a normal vector normal to a surface of the point cloud at the patch location. At 1117 a first spatial image is generated for the patch based on the points being projected on the patch plane at 1115. In addition, depth information for the points of the patch relative to the patch plane is determined at 1116, and at 1118 a depth patch image is generated based on the depth information determined at 1116.

At 1119, it is determined whether there are additional patches for which patch images are to be generated. If so, the process reverts to 1111 for the next patch. If not, at 1120 the patch images for the patches are packed into one or more image frames. In some embodiments, patch images for respective patches may be packed before patch images are determined for other patches. At 1121, an occupancy map is generated based on where the patch images were placed when being packed into the one or more image frames. At 1124, the occupancy map is encoded. As discussed above, in some embodiments, the occupancy map may be encoded using an arithmetic encoder, entropy encoder etc. Also, in some embodiments, the occupancy map may be encoded using a video encoder, wherein the occupancy map is organized as an additional image frame that corresponds with a patch image frame and that represents portions of the patch image frame that are occupied with patch images (e.g. occupied pixels) and portions of the patch image frame that are padded (e.g. non-occupied pixels).

At 1122, spaces in the one or more image frames that are not occupied by patch images are padded. In some embodiments, an occupancy map for a patch image frame may be generated before or after the patch image frame is padded at 1122.

At 1123, the one or more image frames are video encoded, such as in accordance with a high efficiency video coding (HEVC) standard. In some embodiments, in which an occupancy map is represented by an occupancy map video image frame, the occupancy map video image frame may be video encoded at 1123.

Figure 12:
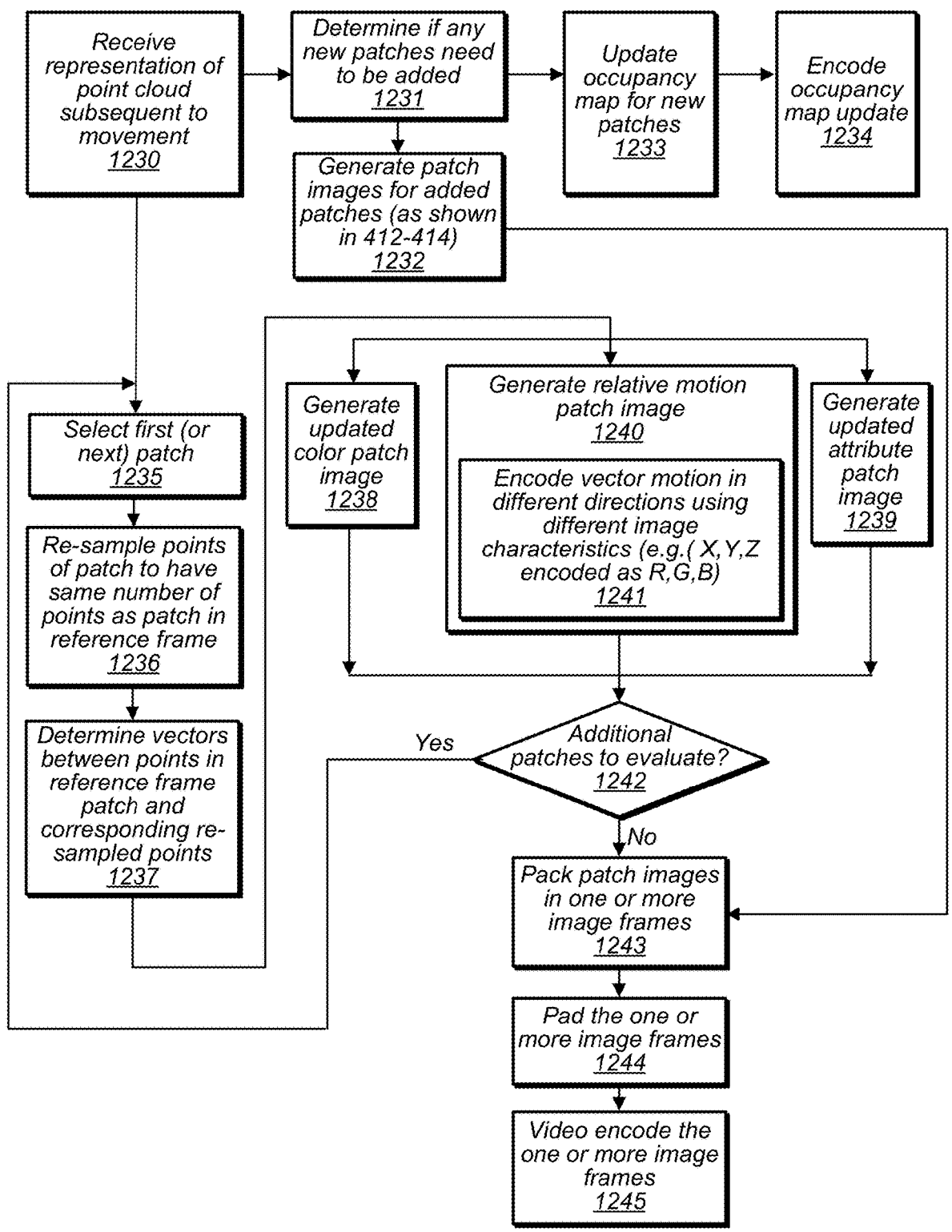
FIG. 12 illustrates patch images being generated and packed into an image frame to compress attribute and spatial information of a moving or changing point cloud, according to some embodiments.

FIG. 12 illustrates patch images being generated and packed into an image frame to compress attribute and spatial information of a moving or changing point cloud, according to some embodiments.

At 1230, point cloud information for a previously encoded point cloud is received wherein the point cloud information represents a subsequent version of the previously encoded point cloud. For example, the subsequent version may be a representation of the point cloud at a subsequent moment in time, wherein the point cloud is moving or changing as time progresses.

At 1231, it is determined if any new patches need to be determined for the point cloud. For example, an object not currently in the previously encoded point cloud may have been added to the point cloud. For example, the point cloud may be a point cloud of a road and a ball may have entered into the road. If there is a need to add a new patch, the occupancy map is updated at 1233 to include the new patch and encoded at 1234. Also, at 1232 patch images are generated for the new patch in similar manner as described in 1112-1114. The generated patch images are included in packing at 1243.

At 1235, a first or next patch of the patches generated for the reference (previous) point cloud is selected. At 1236, the points of the patch are re-sampled as described herein. At 1237 motion vectors for the points included in the selected patch between the reference point cloud and the current point cloud are determined. At 1240 the motion vectors are used to generate a relative motion patch image. For example, in some embodiments, generating a relative motion patch image may comprise, encoding, at 1241, vector motion in different directions using different image characteristics, as described herein. At 1238 an updated color patch image is generated. In some embodiments, the updated color patch image may encode residual values indicating differences in colors of the points of the point cloud included in the patch between the reference point cloud and the current point cloud. In a similar manner, at 1239, other attribute update patch images may be generated.

At 1242, it is determined whether there are additional patches to be evaluated. If so, the process reverts to 1235 for the next patch. If not, at 1243 the patch images for the patches are packed into one or more image frames. In some embodiments, patch images for respective patches may be packed before patch images are determined for other patches.

At 1244, spaces in the one or more image frames that are not occupied by patch images are padded.

At 1245, the one or more image frames are video encoded, such as in accordance with a high efficiency video coding (HEVC) standard. In some embodiments, code-word mapping may be employed to encode N-bit images via one or more M-bit image frames, as described above in regard to FIGS. 1-7.

Figure 13:
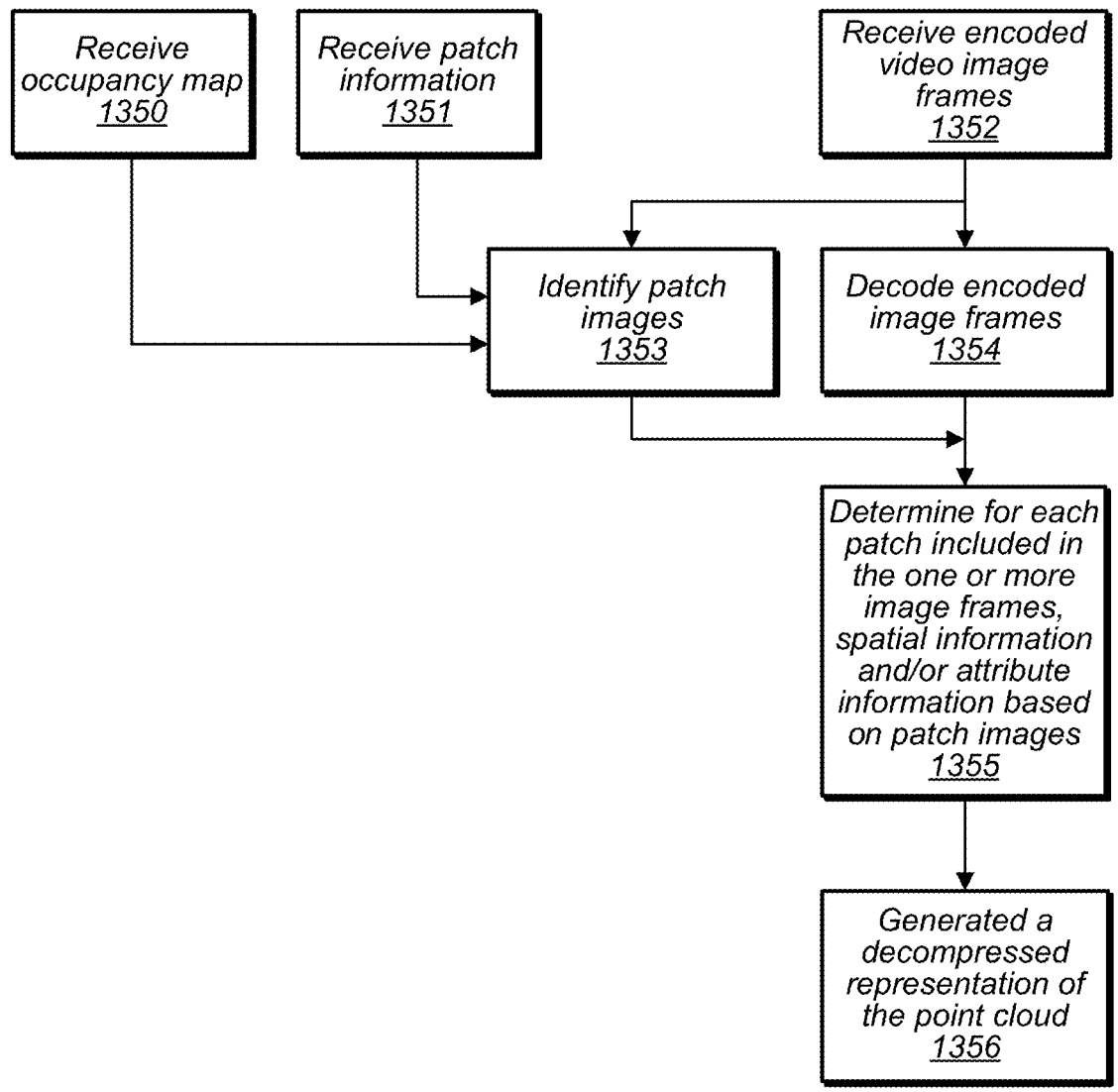
FIG. 13 illustrates a decoder receiving image frames comprising patch images, patch information, and an occupancy map, and generating a decompressed representation of a point cloud, according to some embodiments.

FIG. 13 illustrates a decoder receiving image frames comprising patch images, patch information, and an occupancy map, and generating a decompressed representation of a point cloud, according to some embodiments.

At 1350, an occupancy map is received by a decoder, at 1351 patch information is received by the decoder. In some embodiments the occupancy map and the patch information may be encoded and the decoder may decode the occupancy map and the patch information (not shown). At 1352, the decoder receives one or more encoded video image frames. At 1352 the decoder identifies patch images in the one or more encoded video image frames and at 1354 the decoder decodes the encoded video image frames. In some embodiments, the decoder may utilize the occupancy map and the patch information to identify active and non-active portions of the one or more encoded video images and may adjust one or more decoded parameters used to decode the encoded video images based on whether portions, e.g. blocks, sub-blocks, pixels, etc. comprise active or non-active information. In some embodiments, a decoder may utilize code-word mapping to generate N-bit images from one or more M-bit image frames as described above in regard to FIGS. 1-7.

At 1355, the decoder determines spatial information and/or attribute information for the points of the respective patches and at 1356 generates a decompressed representation of the point cloud encoded in the one or more encoded video images.

Example Applications Using Point Cloud Encoders and Decoders

Figure 14:
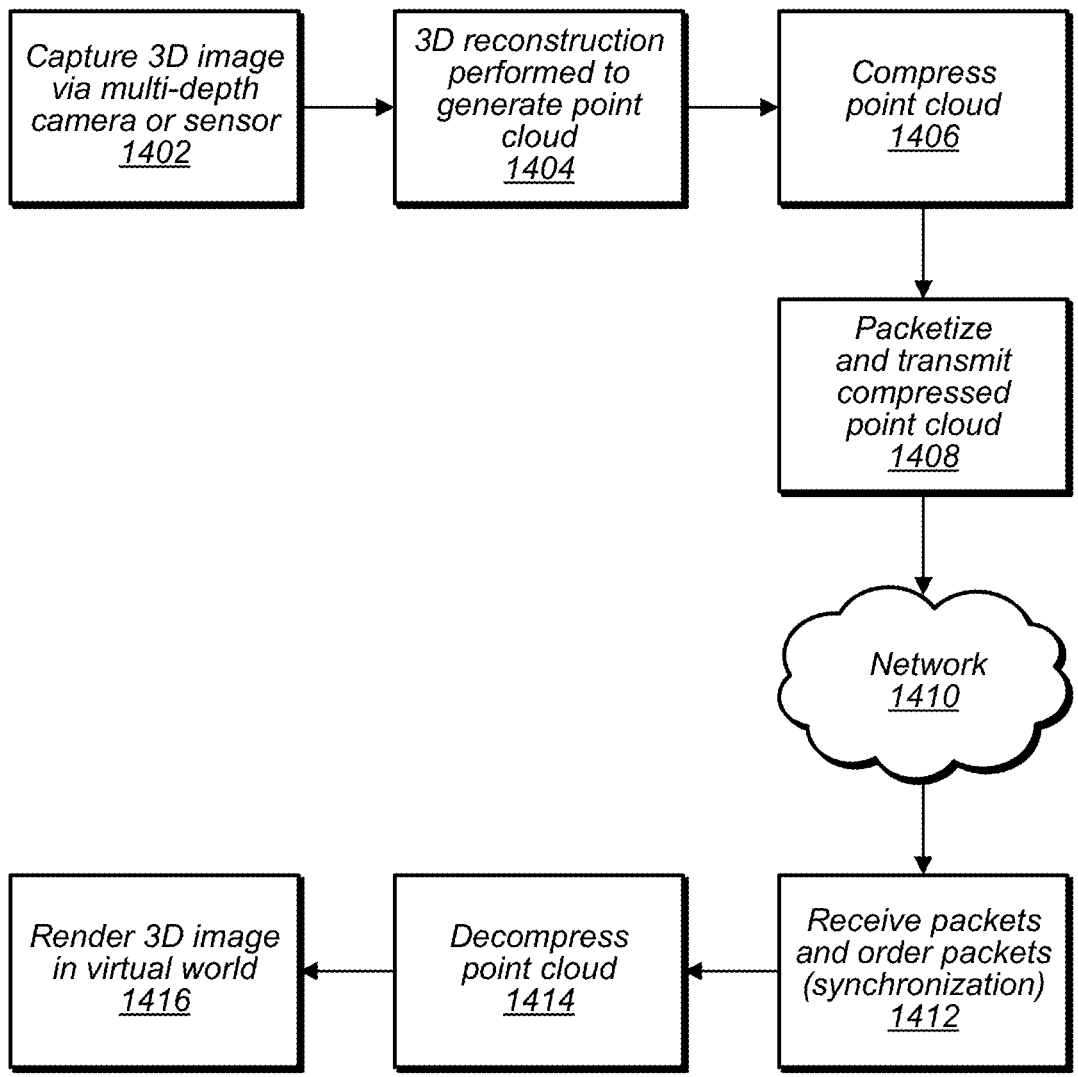
FIG. 14 illustrates compressed point cloud information being used in a 3-D telepresence application, according to some embodiments.

FIG. 14 illustrates compressed point clouds being used in a 3-D telepresence application, according to some embodiments.

In some embodiments, a sensor, such as sensor 802, an encoder, such as encoder 804 or any of the other encoders described herein, and a decoder, such as decoder 816 or any of the decoders described herein, may be used to communicate point clouds in a 3-D telepresence application. For example, a sensor, such as sensor 802, at 1402 may capture a 3D image and at 1404, the sensor or a processor associated with the sensor may perform a 3D reconstruction based on sensed data to generate a point cloud.

At 1406, an encoder such as encoder 804 may compress the point cloud and at 1408 the encoder or a post processor may packetize and transmit the compressed point cloud, via a network 1410. At 1412, the packets may be received at a destination location that includes a decoder, such as decoder 816. The decoder may decompress the point cloud at 1414 and the decompressed point cloud may be rendered at 1416. In some embodiments a 3-D telepresence application may transmit point cloud data in real time such that a display at 1416 represents images being observed at 1402. For example, a camera in a canyon may allow a remote user to experience walking through a virtual canyon at 1416.

Figure 15:
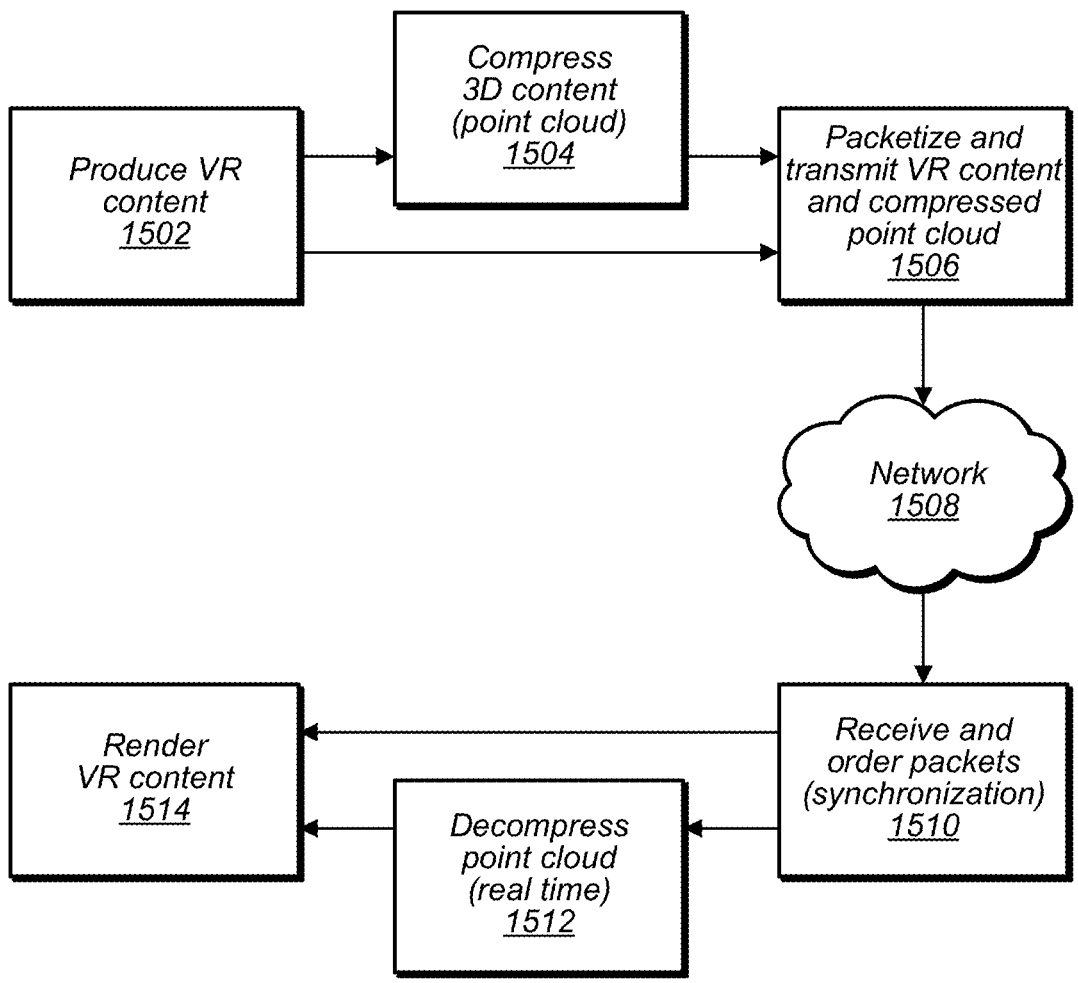
FIG. 15 illustrates compressed point cloud information being used in a virtual reality application, according to some embodiments.

FIG. 15 illustrates compressed point clouds being used in a virtual reality (VR) or augmented reality (AR) application, according to some embodiments.

In some embodiments, point clouds may be generated in software (for example as opposed to being captured by a sensor). For example, at 1502 virtual reality or augmented reality content is produced. The virtual reality or augmented reality content may include point cloud data and non-point cloud data. For example, a non-point cloud character may traverse a landscape represented by point clouds, as one example. At 1504, the point cloud data may be compressed and at 1506 the compressed point cloud data and non-point cloud data may be packetized and transmitted via a network 1508. For example, the virtual reality or augmented reality content produced at 1502 may be produced at a remote server and communicated to a VR or AR content consumer via network 1508. At 1510, the packets may be received and synchronized at the VR or AR consumer's device. A decoder operating at the VR or AR consumer's device may decompress the compressed point cloud at 1512 and the point cloud and non-point cloud data may be rendered in real time, for example in a head mounted display of the VR or AR consumer's device. In some embodiments, point cloud data may be generated, compressed, decompressed, and rendered responsive to the VR or AR consumer manipulating the head mounted display to look in different directions.

In some embodiments, point cloud compression as described herein may be used in various other applications, such as geographic information systems, sports replay broadcasting, museum displays, autonomous navigation, etc.

Example Computer System

Figure 16:
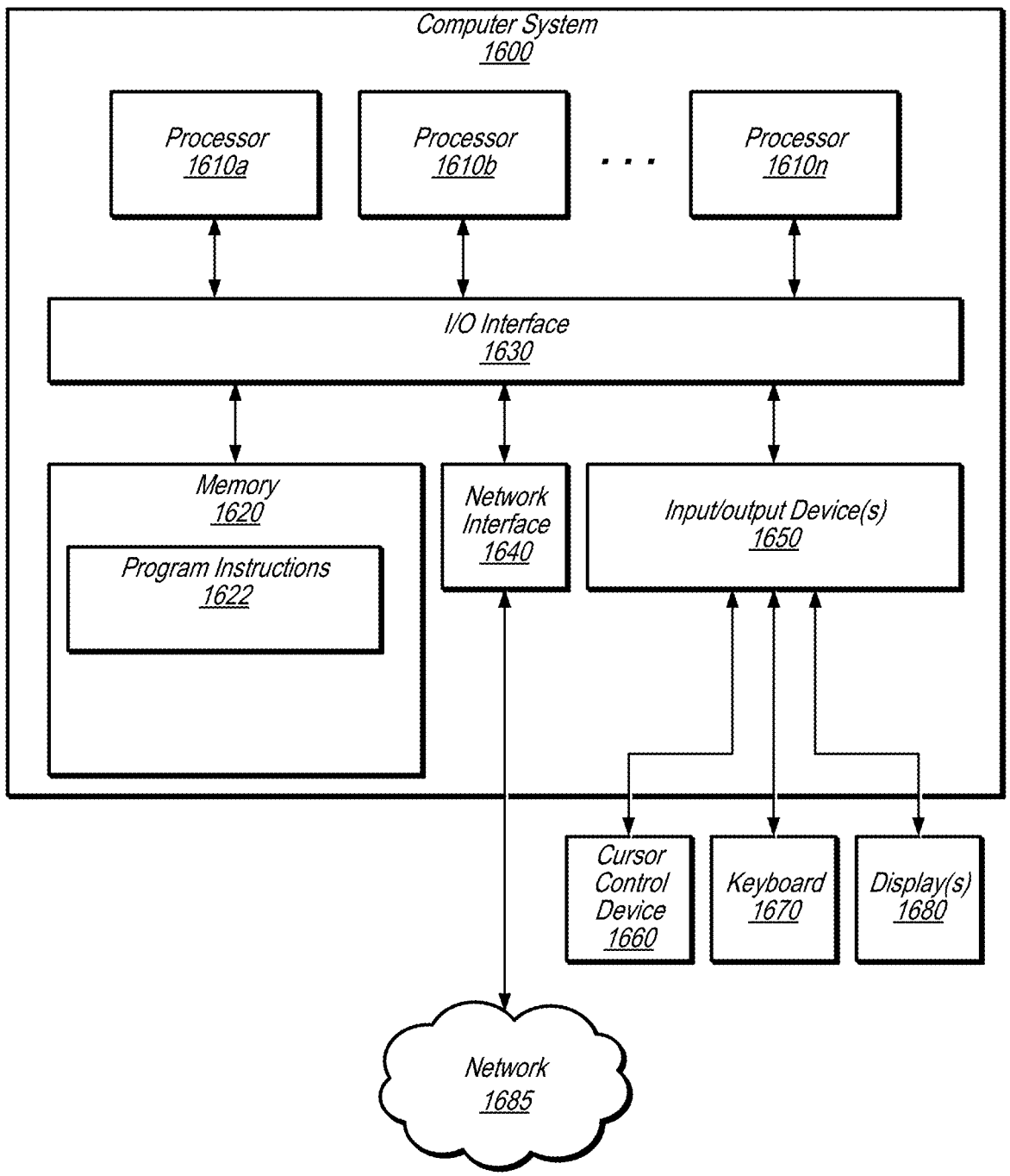
FIG. 16 illustrates an example computer system that may implement an encoder or decoder, according to some embodiments.

FIG. 16 illustrates an example computer system 1600 that may implement an encoder or decoder or any other ones of the components described herein, (e.g., any of the components described above with reference to FIGS. 1-15), in accordance with some embodiments. The computer system 1600 may be configured to execute any or all of the embodiments described above. In different embodiments, computer system 1600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a point cloud encoder or decoder, as described herein may be executed in one or more computer systems 1600, which may interact with various other devices. Note that any component, action, or functionality described above with respect to FIGS. 1-15 may be implemented on one or more computers configured as computer system 1600 of FIG. 16, according to various embodiments. In the illustrated embodiment, computer system 1600 includes one or more processors 1610 coupled to a system memory 1620 via an input/output (I/O) interface 1630. Computer system 1600 further includes a network interface 1640 coupled to I/O interface 1630, and one or more input/output devices 1650, such as cursor control device 1660, keyboard 1670, and display(s) 1680. In some cases, it is contemplated that embodiments may be implemented using a single instance of computer system 1600, while in other embodiments multiple such systems, or multiple nodes making up computer system 1600, may be configured to host different portions or instances of embodiments. For example, in one embodiment some elements may be implemented via one or more nodes of computer system 1600 that are distinct from those nodes implementing other elements.

In various embodiments, computer system 1600 may be a uniprocessor system including one processor 1610, or a multiprocessor system including several processors 1610 (e.g., two, four, eight, or another suitable number). Processors 1610 may be any suitable processor capable of executing instructions. For example, in various embodiments processors 1610 may be general-purpose or embedded processors implementing any of a variety of instruction set architectures (ISAs), such as the x86, PowerPC, SPARC, or MIPS ISAs, or any other suitable ISA. In multiprocessor systems, each of processors 1610 may commonly, but not necessarily, implement the same ISA.

System memory 1620 may be configured to store point cloud compression or point cloud decompression program instructions 1622 and/or sensor data accessible by processor 1610. In various embodiments, system memory 1620 may be implemented using any suitable memory technology, such as static random access memory (SRAM), synchronous dynamic RAM (SDRAM), nonvolatile/Flash-type memory, or any other type of memory. In the illustrated embodiment, program instructions 1622 may be configured to implement an image sensor control application incorporating any of the functionality described above. In some embodiments, program instructions and/or data may be received, sent or stored upon different types of computer-accessible media or on similar media separate from system memory 1620 or computer system 1600. While computer system 1600 is described as implementing the functionality of functional blocks of previous Figures, any of the functionality described herein may be implemented via such a computer system.

In one embodiment, I/O interface 1630 may be configured to coordinate I/O traffic between processor 1610, system memory 1620, and any peripheral devices in the device, including network interface 1640 or other peripheral interfaces, such as input/output devices 1650. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computer system 1600 and other devices attached to a network 1685 (e.g., carrier or agent devices) or between nodes of computer system 1600. Network 1685 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1650 may, in some embodiments, include one or more display terminals, keyboards, keypads, touchpads, scanning devices, voice or optical recognition devices, or any other devices suitable for entering or accessing data by one or more computer systems 1600. Multiple input/output devices 1650 may be present in computer system 1600 or may be distributed on various nodes of computer system 1600. In some embodiments, similar input/output devices may be separate from computer system 1600 and may interact with one or more nodes of computer system 1600 through a wired or wireless connection, such as over network interface 1640.

As shown in FIG. 16, memory 1620 may include program instructions 1622, which may be processor-executable to implement any element or action described above. In one embodiment, the program instructions may implement the methods described above. In other embodiments, different elements and data may be included. Note that data may include any data or information described above.

Those skilled in the art will appreciate that computer system 1600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1600 may be transmitted to computer system 1600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
    an encoder configured to encode an image with pixel values comprising N-bit pixel values (N-bit image) using a plurality of image frames with M-bit pixel values (M-bit image frames),
    wherein to encode the N-bit pixel values of the N-bit image using the plurality of M-bit image frames, the encoder is configured to:
        determine whether a bit-depth of the N-bit pixel values of pixels of the N-bit image being encoded exceeds an image frame bit-depth supported by the encoder; and
        in response to determining the bit-depth of the N-bit pixel values of the pixels of the N-bit image being encoded exceeds the image frame bit-depth supported by the encoder:
            for each N-bit pixel value of the N-bit image being encoded:
                round the N-bit pixel value to a pixel value expressed using an M-bit pixel value supported by the encoder, where M is less than N; and
                determine an error value between the N-bit pixel value of the N-bit image being encoded and a rounded pixel value expressed using the M-bit pixel value;
            encode a first image frame for the N-bit image being encoded, wherein the rounded pixel values expressed using the M-bit pixel values are encoded for pixels in the first image frame at pixel locations corresponding to the pixels of the N-bit image being encoded; and
            encode a second image frame for the N-bit image being encoded, wherein the determined error values are encoded for pixels in the second image frame at pixel locations corresponding to the pixels of the N-bit image being encoded.

2. The system of claim 1, wherein to encode the N-bit pixel values, the encoder is further configured to:
    determine whether a bit-depth difference between the bit-depth of the N-bit pixel values and the bit-depth of the M-bit pixel values exceeds the image frame bit-depth supported by the encoder; and
    in response to determining the bit-depth difference exceeds the image frame bit-depth supported by the encoder:
        for each determined error value:
            round the determined error value to a pixel value expressed using an M-bit pixel value supported by the encoder; and
            determine a second error value between the determined error value and the rounded error value expressed using the M-bit pixel value; and
        encode a third image frame for the N-bit image being encoded, wherein the determined second error values are encoded for pixels in the third image frame at pixel locations corresponding to the pixels of the N-bit image being encoded.

3. The system of claim 1, wherein the encoder is configured to:
    encode the rounded pixel values prior to determining the error values;
    decode, at the encoder, the rounded pixel values to determine reconstructed rounded pixel values; and
    determine the error between the pixel value of the N-bit image being encoded and the reconstructed rounded pixel values.

4. The system of claim 1, wherein the encoder is further configured to:
    in response to determining, a bit-depth of pixel values of another image being encoded is less than the image frame bit-depth supported by the encoder:
        scale the pixel values of the other image being encoded such that the pixel values span a range of M-bit pixel values supported by the encoder.

5. The system of claim 4, wherein to scale the pixel values, the encoder is configured to:
    multiply N bit-depth pixel values of the other image by a factor of $2^{M-N-i}$, where i ranges from zero to M−N;
    multiply the N bit-depth pixel values of the other image by a factor of $2^{(M-i)-1}$ and divide a resultant of the multiplication by a factor of $2^{(N-1)}$, where i ranges from zero to M−N; or
    multiply the N bit-depth pixel values of the other image by a factor of X and divide a resultant of the multiplication with X by a factor of $(2^N-1)$, where X is between $2^N-1$ and $2^M-1$.

6. The encoder of claim 1, wherein the encoder is configured to:
determine one or more quantization parameters for use in decoding the first image frame and the second image frame, wherein the one or more quantization parameters are determined to yield a lossless or near lossless representation of the N-bit image being encoded; and
signal the determined one or more quantization parameters.

7. The system of claim 1, further comprising:
one or more sensors configured to capture a plurality of points that make up a point cloud, wherein respective ones of the points comprise spatial information for the point and attribute information for the point;
wherein the encoder is configured to:
determine for the point cloud, a plurality of patches each corresponding to portions of the point cloud;
generate, for each patch, two or more patch images;
pack generated patch images for the determined patches into one or more packed image frames; and
generate an occupancy map image frame comprising pixels indicating portions of the packed image frames corresponding to the patch images;
wherein at least one of the one or more packed patch image frames or the occupancy map image frame comprises N-bit pixel values; and
wherein the encoder is configured to encode the at least one of the one or more packed image frames or the occupancy map image frame using one or more image frames with M-bit pixel values.

8. The system of claim 1, wherein the encoder is configured to encode the first image frame and the second image frame using a lossy high efficiency video coding algorithm, and
wherein reconstruction of the N-bit image with the pixel values comprising N-bit values, reconstructed from the rounded pixel values of the first image frame and the error values of the second image frame, results in a lossless or near-lossless representation of the N-bit image with the pixel values comprising N-bit pixel values.

9. A system, comprising:
a decoder configured to:
receive a plurality of image frames comprising M-bit pixel values (M-bit image frames) encoded from an N-bit image with pixel values comprising N-bit pixel values; and
reconstruct the N-bit image comprising N-bit pixel values from the plurality of M-bit image frames, wherein to reconstruct the N-bit image, the decoder is configured to:
identify, based on a signaled value, the plurality of M-bit image frames to be used to reconstruct the N-bit image comprising N-bit pixel values; and
for the N-bit image with N-bit pixel values that is to be reconstructed from two or more M-bit image frames comprising M-bit pixel values:
decode a first M-bit image frame comprising rounded N-bit pixel values that have been rounded to be expressed using an M-bit pixel value;
decode a second M-bit image frame comprising error values for the rounded N-bit pixel values; and
modify the decoded rounded N-bit pixel values based on the error values.

10. The system of claim 9, wherein for a given N-bit image with N-bit pixel values that is to be reconstructed from a single M-bit image frame comprising M-bit pixel values, the decoder is configured to:
determine or receive a mapping between the N-bit pixel values and the M-bit pixel values of the single M-bit image frame, wherein M is greater than N; and
adjust the M-bit pixel values of the M-bit image frame back to N-bit pixel values of a reconstructed version of the given N-bit image based on the mapping.

11. The system of claim 10, wherein for the given N-bit image with the N-bit pixel values that is to be reconstructed from the single M-bit image frame comprising the M-bit pixel values, the decoder is further configured to:
receive mapping ranges for mapping pixel values, scaled up into M-bit pixel values, back into N-bit pixel values, wherein mapping ranges associated with more commonly encoded N-bit pixel values have larger ranges than mapping ranges associated with less commonly encoded N-bit pixel values; and
apply the mapping ranges to the M-bit pixel values to map the M-bit pixel values back into N-bit pixel values.

12. The system of claim 10, wherein the decoder is configured to:
apply a spatial smoothing filter to the scaled pixel values, wherein the spatial smoothing filter adjusts the scaled pixel values.

13. The system of claim 12, wherein the spatial smoothing filter adjusts the scaled pixel values based on unequal error costs resulting from a miss-encoding of bits as zeros or ones, wherein errors resulting from a zero being encoded as a one and errors resulting from a one being encoded as a zero have different error costs.

14. The system of claim 12, wherein the spatial smoothing filter comprises one or more of:
a bi-linear filter;
a bi-cubic filter;
a cosine filter;
a Gaussian filter; or
a Lanczos filter.

15. The system of claim 10, wherein the decoder is configured to:
apply a spatio-temporal smoothing filter to the scaled pixel values, wherein the spatio-temporal smoothing filter adjusts the scaled pixel values based, at least in part, on pixel values of preceding encoded image frames.

16. A method comprising:
encoding an image with pixel values comprising N-bit values (N-bit image) using a plurality of image frames with M-bit pixel values (M-bit image frames), wherein the encoding comprises:
for each N-bit pixel value of the N-bit image being encoded:
rounding the N-bit pixel value to a pixel value expressed using an M-bit pixel value;
determining an error value between the N-bit pixel value of the N-bit image being encoded and a rounded pixel value expressed using the M-bit pixel value;
encoding a first image frame for the N-bit image being encoded, wherein the rounded pixel values expressed using the M-bit pixel values are encoded for pixels in the first image frame at pixel locations corresponding to pixels of the N-bit image being encoded; and
encoding a second image frame for the N-bit image being encoded, wherein the determined error values are encoded for pixels in the second image at the pixel locations corresponding to the pixels of the N-bit image being encoded.

17. The method of claim 16, comprising:

determining a bit-depth difference between a bit-depth of the N-bit pixel values and a bit-depth of the M-bit pixel values exceeds an image frame bit-depth supported by an encoder performing the encoding;

for each N-bit pixel value of the N-bit image being encoded:

rounding the error value to a pixel value expressed using an M-bit pixel value supported by the encoder; and determining a second error value between the error value and the rounded error value; and encoding a third image frame for the N-bit image being encoded, wherein the second error values are encoded for pixels in the third image frame at pixel locations corresponding to the pixels of the N-bit image being encoded.

18. The method of claim 17, wherein the error values of the second image frame and the second error values of the third image frame are encoded using different bit-depth values.

19. The method of claim 16, further comprising:

determining, for another N-bit depth image to be encoded, that a bit-depth of pixel values of the other N-bit depth image to be encoded is less than an image frame bit-depth supported by an encoder performing the encoding;

scaling the pixel values of the N-bit depth image being encoded such that the pixel values span a range of M-bit values supported by the encoder; and encoding another M-bit image frame for the other N-bit depth image, wherein M-bit values are encoded in the other M-bit image frame for the other N-bit depth image.

20. The method of claim 19, further comprising:

encoding in a separate stream from the other M-bit image frame, one or more mapping parameters for use in converting the encoded other N-bit depth image back into an N-bit depth representation.

* * * * *